United States Patent
Vukmirovic et al.

(10) Patent No.: US 12,118,087 B2
(45) Date of Patent: Oct. 15, 2024

(54) MACHINE LEARNING METHODS AND SYSTEMS FOR DETERMINING FILE RISK USING CONTENT DISARM AND RECONSTRUCTION ANALYSIS

(71) Applicant: Glasswall (IP) Limited, London (GB)

(72) Inventors: Petra Vukmirovic, London (GB); Matthew James Cavey, Colchester (GB); Matthew James Dignum, Chelmsford (GB)

(73) Assignee: Glasswall (IP) Limited (GB)

( * ) Notice: Subject to any disclaimer, the term of this patent is extended or adjusted under 35 U.S.C. 154(b) by 0 days.

(21) Appl. No.: 18/548,332

(22) PCT Filed: Jan. 28, 2022

(86) PCT No.: PCT/GB2022/050230
§ 371 (c)(1),
(2) Date: Aug. 29, 2023

(87) PCT Pub. No.: WO2022/162379
PCT Pub. Date: Aug. 4, 2022

(65) Prior Publication Data
US 2024/0273198 A1     Aug. 15, 2024

Related U.S. Application Data

(60) Provisional application No. 63/182,707, filed on Apr. 30, 2021, provisional application No. 63/143,760, filed on Jan. 29, 2021.

(51) Int. Cl.
*G06F 21/56* (2013.01)

(52) U.S. Cl.
CPC .................. *G06F 21/56* (2013.01)

(58) Field of Classification Search
USPC .................................................... 726/24
See application file for complete search history.

(56) References Cited

U.S. PATENT DOCUMENTS

| 11,627,148 B2 * | 4/2023 | Desai .................. G06F 16/955 726/24 |
| 2014/0090061 A1 | 3/2014 | Avasarala et al. |

(Continued)

OTHER PUBLICATIONS

Demand and amendment (dated Nov. 28, 2022), IPER indicating allowability (dated Jan. 2, 2023) in PCT App. No. PCT/GB2022/050230 filed Jan. 28, 2022; in 14 pages.

(Continued)

*Primary Examiner* — Christopher C Harris
(74) *Attorney, Agent, or Firm* — Knobbe, Martens Olson & Bear LLP

(57) ABSTRACT

File risk and malware detection and classification can be enhanced using machine learning analysis of content disarm and reconstruction (CDR) output. Correlations can be discovered or analyzed between individual elements of such outputs, which can include an XML report. Such correlations can provide useful information on threat intelligence and help validate content disarm and reconstruction. A method can include training machine learning algorithms with a dataset derived from CDR results from test files labelled as malicious or not malicious; instructing algorithms to predict probabilities; and determining correlation between the report items and malware (for example, using the function feature importances and the SHAP value method).

19 Claims, 17 Drawing Sheets

(56) References Cited

U.S. PATENT DOCUMENTS

| | | | |
|---|---|---|---|
| 2018/0218155 A1* | 8/2018 | Grafi | G06F 21/565 |
| 2018/0268143 A1* | 9/2018 | Grafi | G06F 21/54 |
| 2019/0268252 A1 | 8/2019 | Goh et al. | |
| 2019/0311118 A1 | 10/2019 | Grafi | |
| 2020/0065477 A1* | 2/2020 | Surdu | G06F 9/45558 |
| 2022/0303288 A1* | 9/2022 | Wang | H04L 63/1433 |

OTHER PUBLICATIONS

Kadiyala, et al. "Hardware Performance Counter-Based Fine-Grained Malware Detection"; ACM Transactions on Embedded Computing Systems, ACM, New York, NY, US; vol. 19. No. 5, Article 38, Publication date: Sep. 2020; pp. 1-17.

* cited by examiner

Ⓐ

```
02 00 00 00 00 00 00 00 00 00 18 00    . . . . . . . . . . . .
00 11 84 00 00 15 06 05 00 01 00 00    . . . . . . Σ . . . . .
00 60 84 00 00 00 00 01 00 00 00 FF    . ` . . . . . . . . . ȳ
00 00 00 00 00 00 02 00 00 00 00 00    . . . . . . . . . . . .
10 00 00 0F 04 00 11 04 14 00 00 0F    . . . . . . . . . . . .
10 00 00 0F 04 00 11 04 14 00 00 0F    . . . . . . . . . . . .
10 00 00 0F 04 00 11 04 14 00 00 0F    . . . . . . . . . . . .
10 00 00 0F 04 00 11 04 14 00 00 0F    . . . . . . . . . . . .
10 00 00 0F 04 00 11 04 14 00 00 0F    . . . . . . . . . . . .
```

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| ISID |||||||||||||||||||||||||||||||||
| UNUSED1 |||||||||||||||||||||||||||||||||
| UNUSED2 |||||||||||||||||||||||||||||||||
| CLFOLCL |||||||| IBSTFITAUTONUM |||||||| GRFHIC |||||||| UNUSED3 ||||||||

MACHINE LEARNING METHODS AND SYSTEMS FOR DETERMINING FILE RISK USING CONTENT DISARM AND RECONSTRUCTION ANALYSIS

RELATED APPLICATION DATA

This application claims the benefit of U.S. Provisional Patent Application Ser. No. 63/143,760, filed Jan. 29, 2021, and U.S. Provisional Patent Application Ser. No. 63/182,707, filed Apr. 30, 2021, both of which are incorporated by reference herein for all purposes.

BACKGROUND

Field

The disclosure addresses problems and solutions in malware detection and file and computer security.

Related Art

Other approaches such as sandboxing, behavioral analysis or static analysis of malware usually rely on existing malware databases or known malware characteristics.

SUMMARY

The described machine-learning based approaches are useful for identifying malware that has previously been undetected. For example, with content disarm and reconstruction (CDR) methods, that, unlike other methods that look for "known bad," look for "known good" and make classification decisions based on a delta of the actual analyzed file and "known good" file.

DETAILED DESCRIPTION

Figure 1:
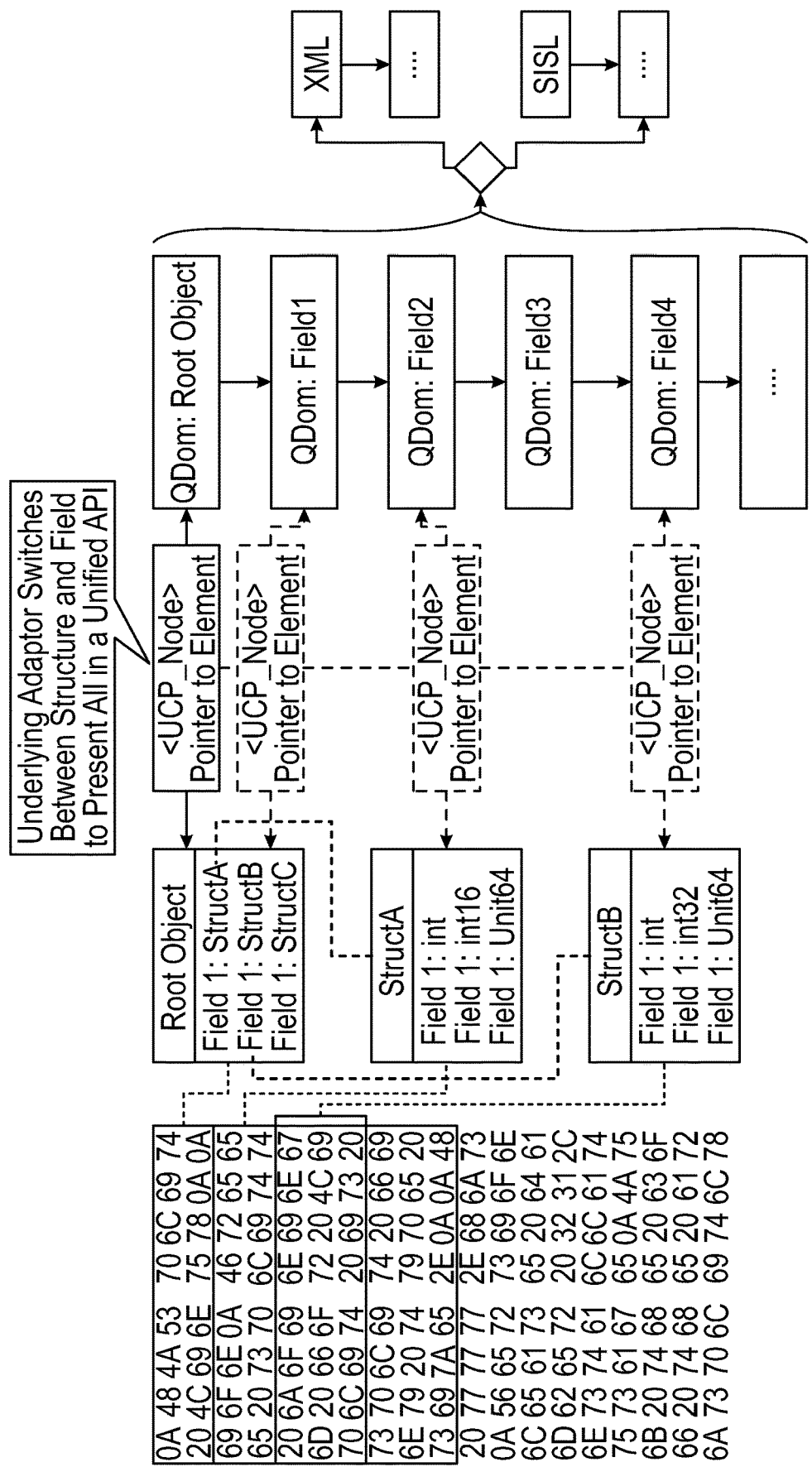
FIG. 1 shows a file deconstruction sample through to export format.

One general purpose of the disclosed technology is to determine the risk of a file with machine learning algorithms trained on a dataset originating from content disarm and reconstruction analysis (CDR). Another purpose is to isolate features of file content/structure from the CDR report that pose a high risk to the file and are directly linked to malware. This aids threat intelligence with providing insight into malware behaviour (what artifacts it leaves on the file structure). Multiple problems are solved. For example, detection of unknown malware, determining the risk of an individual file, and extracting file content structures linked to malware.

Disclosed is a method to determine the risk of a file based on machine learning analysis of content disarm and reconstruction (CDR) output (e.g., a machine and human readable, e.g., XML, summary report from the Glasswall core CDR engine). The Glasswall core engine is described at U.S. Pat. Nos. 9,729,564, 8,185,954, 10,360,388, 8,533,824, 9,832,222, and 9,729,513, and U.S. Patent Publication Nos. 20160147998 and 20170353475, which are herein incorporated by reference in their entirety. Extensible Markup Language (XML) is a markup language that defines a set of rules for encoding documents in a format that is both human-readable and machine-readable. Correlations can be discovered or analyzed between individual elements of the XML report and malware. Such correlations can provide useful information on threat intelligence and content disarm and reconstruction. The CDR output used for training a machine learning algorithm (or using the trained algorithm) need not be in an XML format, and it need not be presented to a user at all. The described systems and methods can be implemented using any CDR output, and can be implemented using other data arising from a CDR process from that discussed in the examples here. For example, a Dynamic Data Exchange (DDE) content type may not be available in all CDR outputs for computer data files, for example Word® and Excel® files. Nevertheless, the described approaches can be used with the output that is available in the backend of a CDR system. An example of the disclosed method can comprise the steps of: training machine learning algorithms with a dataset derived from the XML (or functionally equivalent) reports of test files labelled as malicious or not malicious; instructing algorithms to predict probabilities; and using the function feature importances and the SHapley Additive explanations (SHAP) value method to determine correlation between the report items and malware. Report items and features used by these algorithms can comprise, for example: issueID ranges, file content items, file type and remediation count. Trained algorithms can be programmed into an API to give risk prediction probabilities per file (e.g., as a percentage 0-100%) and to extract the correlation items per file using the feature importances function and the SHAP method, for example. This method can use a CDR XML analysis report (e.g., as translated using a script into another format such as CSV format) as input for the machine learning model to determine the risk of a file. It can also give a risk/probability and a classification. It uses CDR to create features for the dataset, therefore it is based on file content to make the classification estimations. Unlike other methods (e.g., sandboxing, behavioral analysis or static analysis of malware) that look for "known bad," this method looks for "known good" and makes classification decisions based on the delta of the actual analyzed file and "known good" file. This CDR based approach can thus be used for malware detection and risk scoring of a file.

The machine learning algorithms used in disclosed example methods are random forest and boosted gradient models. These can be trained in unique and very useful ways. For example, these models can be trained with a dataset based on CDR analysis reports reflecting file content and issues generated based on "known good" specifications. Afterwards a probability prediction function can be used to estimate the risk of the file and SHAP values and feature importances are computed based on the trained model. As this trained model is based on file content and structure it will generalize to new data. Therefore it can address the classification and risk of 0-day (unknown) malware, and may allow further algorithms to be trained. These algorithms can specialize in a specific type of file (pdf, docx, adobe, etc.) or in multi-class malware detection, where it could also detect the type of malware.

The disclosed technology can be used in a malware detection software tool, in risk scoring (e.g., a file threat index) for individual files, in a "risky feature" selection tool for individual files and threat intelligence insights, and/or a malware classification tool (i.e. determining what type of malware is in the file).

The disclosed technology can differ from, but address similar goals as, malware detection that uses signature detection, behavioral analysis, and static analysis. However, no method is believed to use CDR analysis (file content analysis) and machine learning combined to classify malware.

The fight against unknown (also known as zero-day or 0-day) malware has always been a challenge for cyber security researchers. The methods described herein take a different approach to this problem, by using content disarm and reconstruction analysis to train machine learning models which aid risk probability scoring and malware detection. Methods according to the present disclosure may use file content as a feature for training a machine learning model in malware detection. There is described herein a method to determine the risk of a file based on machine learning analysis of the content disarm and reconstruction (CDR) output summary report from the Glasswall core engine (i.e. an example of CDR software). This method may also entice a correlation determination between individual elements of the report and malware—which may aid threat intelligence and content disarm and reconstruction. Example methods according to the present disclosure may comprise of these steps: training machine learning algorithms with a dataset derived from the analysis reports of test files labelled as malicious or not malicious, instructing algorithms to predict probabilities and finally using additional machine learning functions to determine correlation between the report items and malware. The report items and features used by these example algorithms may include issue ID ranges, file content items, file type and remediation count. These trained algorithms may be programmed into an application programming interface (API) to give risk prediction probabilities per file as a percentage 0-100% and to extract the feature importance per file.

Content disarm and reconstruction software (CDR) has spread rapidly over the past few years and a significant number of companies are using this method to protect their systems from ongoing malware. However, content disarm and reconstruction software (CDR) has not historically had a principal intent to recognize malware. Rather, it strips a file down to its components and reconstructs the file based on 'known good.' This is a different paradigm than that used by many other approaches to malware evasion. CDR is a method for processing an electronic file to create a substitute electronic file containing only allowable content data. In summary: an existing file is sanitized and replaced with a substitute file. The reconstructed file is based on manufacturer specifications.

Standard malware detection uses largely available data-sets compiled by extracting features of malware behavioral analysis, static analysis, or image processing techniques. In contrast, the present disclosure uses file content items as features and uses CDR analysis in the dataset formation. Methods according to the present disclosure use machine learning algorithms to assert the risk of a file being malicious based on the analysis generated after content disarm and reconstruction. Such methods can be used for identifying unknown malware, determining the risk of a file and at the same time validating the content and disarm method.

This disclosure also addresses output of CDR, how it can be used with machine learning to give insight into the threat of the file, and how this threat intelligence can be used to validate CDR as an anti-malware method. Companies providing content disarm and reconstruction services follow a "trust no file" approach in cyber security. This disclosure improves the capabilities of the CDR process, by using a file analysis report produced by a CDR core engine, and constructing a data-set which trains machine learning algorithms. This disclosure describes how this method can be used to detect unknown malware. Machine learning may be used to identify malware in a symbiosis with CDR. By analyzing the metrics produced by machine learning algorithms, this disclosure demonstrates the advantages of CDR as a technology. In a world of constantly changing malware, new methods (such as those disclosed here) that can be used for file risk reduction and threat intelligence are a valuable addition to improving file safety.

The search for appropriate detection of unknown malware is never ending. Secure and safe methods are needed to provide file safety. New types of malware can run on the kernel mode and are more and more destructive. Business reports and scientific research say approximately 1 million malware files are created every day, depriving the world economy of $6 trillion annually. According to many, foolproof malware detection is impossible. The most widely used malware detection method, signature-detection, has proved to be inefficient. CDR provides a new and different approach. By default, it does not focus on detecting malware, but rather on providing a clean and safe file. This disclosure demonstrates CDR's capabilities of providing threat intelligence, risk probability and unknown malware detection. CDR is a technology that can be used to help address ransomware and zero-day attacks across various sectors.

Embodiments of the present disclosure provide machine learning methods that operate post CDR analysis to assist in detecting unknown malware. The present disclosure also provides examples that use these machine-learning and CDR methods to determine the innate risk of a file.

This disclosure describes how trained machine learning algorithms can be used as part of an antivirus architecture—for example, in conjunction with a CDR core engine. The following description defines the CDR method, describes some CDR technology, and compares it to other methods of malware evasion.

About CDR

CDR can help banks, law firms, financial services, critical nation infrastructures, government agencies, military forces, and financial institutions. The aim is to protect a secured system from malicious attacks. CDR core engines can be situated at the ingress points into a computer network. Incoming files can be intercepted for CDR through email system or a "file-drop" graphical user interface (GUI). A CDR core engine can sit on a proxy server between the client and a website or designated cloud storage (such as Share-Point), to ensure that downloaded files are malware free. According to an example, the file may be sent through an Internet Content Adaptation Protocol (ICAP) server. Next the file may be parsed to the core engine via a complex system for automating deployment, scaling, and management of containerized applications (e.g., a Kubernetes architecture) and may be processed in a request processing pod. Afterwards, the newly regenerated file may be returned to the client through the ICAP server again. There are numerous ways in which CDR can prevent malware from spreading into a protected system. During this process of CDR, files may be deconstructed, sanitized, and reconstructed to the manufacturer's specifications. CDR has some similarities, but is not identical, to Content Threat Removal (CTR). Both technologies sit on the network boundary protecting a secured system. CDR aims to remove malicious code. CTR aims to remove the threat posed by content entering a protected system. CTR can also provide a degree of information leakage from the system by extracting the business information that data content is carrying as it arrives and then discards the data. Completely new data can then be built to carry the information to its destination. Some CDR methods may convert the file format from format A to format B, while some detect the file type and create a reconstructed file of the same file type.

To harden cyber security systems and standardize the CDR process, the National Security Agency in the United States has published Inspection and Sanitization Guidance for various file types, including but not limited to Exchangeable Image Format (EXIF), Portable Network Graphic (PNG) and Microsoft Office files (DOCX, PPTX, etc.) The guidance for Inspection and Sanitization (which can be implemented, for example, through CDR) outlines that the Office Open XML (OOXML) file format (the default Office 2007) storage mechanism enables the development of tools to inspect and sanitize hidden data, metadata, and malicious code is a more efficient way.

The most common defenses deployed against malware are signature detection and sand-boxing. Signature detection detects known patterns associated with malware attacks. Sandboxing is basically parsing a file in a detonation chamber and observing the behavior. CDR does not necessarily look for malware; it looks for known (a standard) good of that file type and builds a new version of the file according to the manufacturer specifications. CDR is a prevention technique, different from various other anti-virus technologies. Static analysis-based detection has been quite ineffective in real time conditions and often it is used as baseline protection with next generation technologies as supplements. The reason that popularity of CDR is rising versus sandboxing, especially in email systems, is its speed and ease of use. Latency in sandboxing techniques seems to be a common obstacle for the end users. CDR offers a good balance between usability and security, with the additional benefit that the user gets to keep the regenerated file, even if it was initially infested with malware.

CDR is a mechanism to protect documents by analytically disassembling them, like a medical dissection. The CDR process is automated and unlike antivirus systems it does not look for markers, but it completely deconstructs and validates the document-almost to the level of "document DNA"—and then reconstructs it without the document being changed to a different form. Every bit and byte can be analyzed.

CDR Methodology

One CDR method uses the Glasswall core engine. It has a regeneration capability whereby only known good data can be generated to a sanitized, safe file. Example descriptions of a Glasswall core engine and CDR approaches are provided in U.S. Pat. Nos. 9,729,564, 8,185,954, 10,360,388, 8,533,824, 9,832,222, and 9,729,513, and U.S. Patent Publication Nos. 20160147998 and 20170353475. These descriptions are all incorporated herein by reference and made part of this specification for all purposes. The engine has an analysis mode which generates an XML report based on file content, and a regeneration mode, whereby the file is analyzed and a safe, substitute copy is made. The XML report can include content items (e.g., structures found in the file), issue items (e.g., structures that do not match the specification), sanitization items (items that would be taken out as per the content management policy), and/or remediations (structures automatically corrected back to specification). The Glasswall library can receive a document through an API and pass it through several process cycles. The initial cycles elicit the structure of the document and the sizes of its constituent parts. The later cycles conduct syntactic and semantic checks which identify possible sources of risk, out-of-range fields, or malformed structures. One or more of these items and structures can be used as features for training a machine learning algorithm.

CDR technology can use three aspects: In a first aspect, Deep-File Inspection, the file gets parsed into memory and three distinct layers are inspected: (1) Visual Content Layer—text and images; (2) Active Content Layer—Macros, JavaScript, embedded files or data connections; and (3) File Structure Layer—the framework within which the visual and active content is stored and managed. In a second aspect, Remediation, a document's structure is repaired to comply with file type vendor specifications. In a third aspect, Sanitization, active content is removed, reducing the risk of a file while taking functional features that are not needed as collateral damage. Often controlled by policy, sanitization allows users to get the document features they need and strips out the functions they don't need.

The Information Security Guidelines (ISGs) mentioned above can have recommendations that match the procedures of the described core engine. For example, they recommend that inspection and sanitization programs should perform one or more actions on a construct. Examples include Validate, Remove, Replace, External Filtering Required, or Review. A Recommendations section (e.g., for each construct) can recommend actions and include explanations for these actions.

CDR can be described as a method for processing an electronic file to create a reconstructed version of the same file containing only allowable content data. The new version is a substitute for the original file. Therefore the receiving computer system is not endangered by the new reconstructed file. Files to be run on a system require specific proprietary applications and data. To be read by these applications, files must comply with rigid standards. This allows the technology to detect "normal" acceptable files or "known good." As this type of technology does not initially seek to detect viruses or virus-like behavior, it has an advantage in detecting unknown (e.g., previously undiscovered and catalogued) malware over antivirus programs that may depend on or use periodically updated lists or databases of known malware.

In some methods, a core engine can receive an input file having a file format configured with a structured storage which then gets disassembled into at least one subfile. Each subfile may be a stream subfile. The computer analyses the item in the stream subfile for an unwanted behaviour by determining an acceptability threshold. It distinguishes a visibility of the item and recognizes a necessity of the item. Based on this analysis the result is a processed subfile. The final step is an assembly of the processed subfiles into an output file maintaining the same file format as the input file.

The Glasswall core engine can be understood as comprising software 'cameras' which take multiple "snapshots" of the file. The 'cameras' are programmed (in the C++ programming language) to know the precise structure of the file. There is a definition language which is used to define the physical structure of every element within a file type or that component type. As seen in FIG. 1 that can be then used to break down the binary elements (represented in hexadecimal on FIG. 1) of the document. Binary elements represent a particular structure within a file, which are then grouped into fields. A file can be a single entity with a whole stream of structures in it or it might be a compacted representation-a container (archived file). In the ladder then individual components and their relationships would be parsed though an individual camera. As an example, a document might contain a few XML elements with media files within it such as images which would then be parsed through separate cameras. Sometimes there might be a recursive structure present which has the same type of document embedded within it, in that case that container needs to be opened and parsed. Specific cameras can be used from root level downwards. For instance, a JPEG (Joint Photographic Experts Group) camera can be used at root level or to parse an image within a document.

Figure 2:
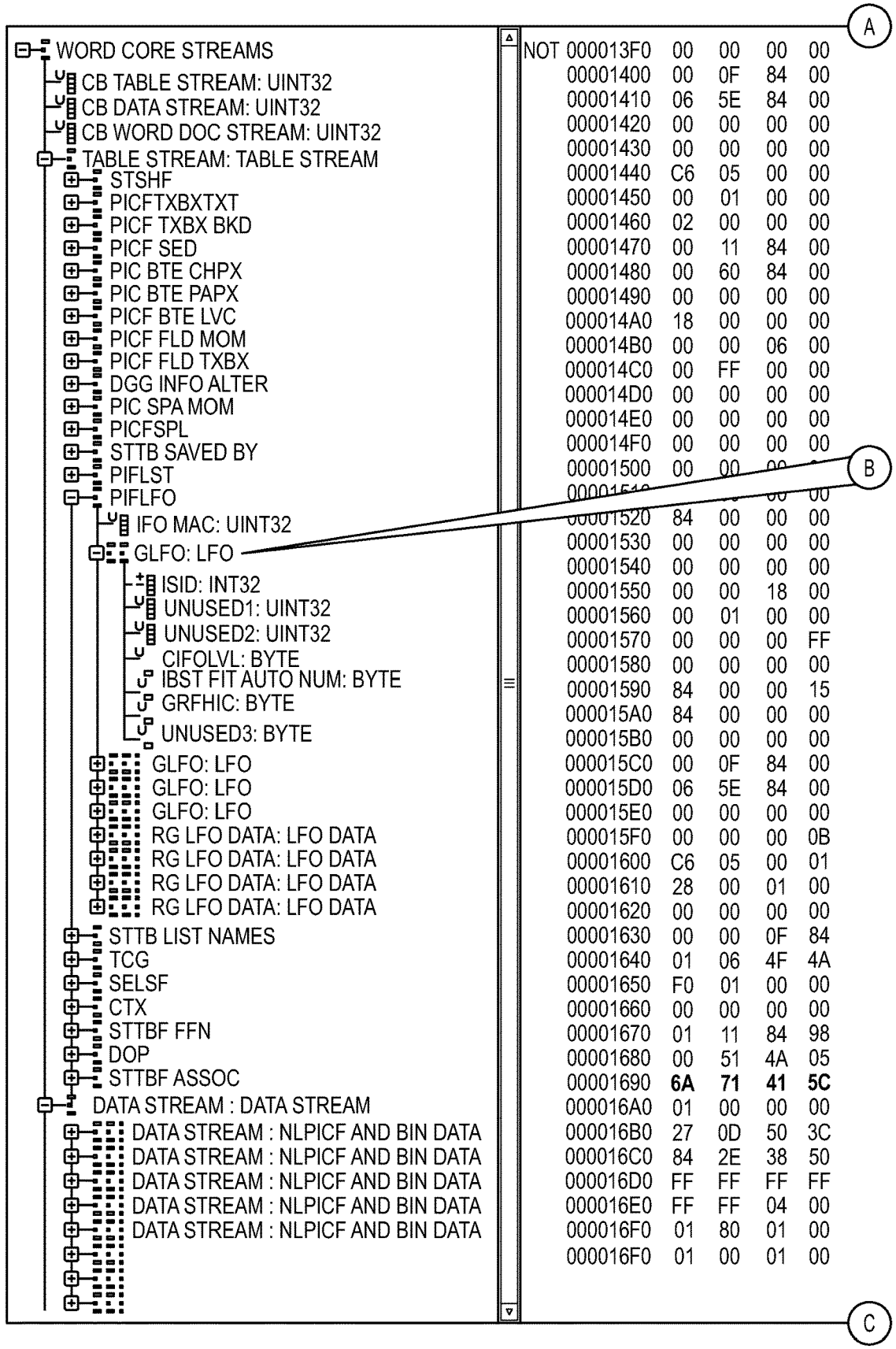
FIG. 2 shows a document tree example from MS Word.

FIG. 2 shows the breakdown of a stream within a Microsoft (MS) Word Document. It illustrates how the cameras identified (from the structural information within a specification) what a particular element would look like and where it is mapped to in the physical file. So, after the deconstruction there is a separate set of validations on it. The validations are performed based on the value ranges that are valid for each particular field within a particular structure. For example, if according to the manufacturer specifications a particular field should hold 10 values, but it holds 50, anything outside of that range is considered a potential fault or issue which can then yield a remediation process. Issues are given IDs and are grouped within IssueID ranges. Validation can also check structural information and correlations. For example, a particular file element should not be occurring more than 10 times if there is a valid field somewhere that says the count for this is 10. All this information can be assembled into an analysis report (which can contain, for example, issues, content items, remediations and sanitisations). Every structure will also be listed with a quantity (count). Occasionally there are consistent issues found within a certain filetype that are repeated consistently in thousands of new documents. This occurs when the manufacturer introduces software changes, but these changes may not be introduced into the official initial specifications. A service provider can investigate these occurrences. In some cases, they may be part of the desired file structure, so the provider can create the validation specifications of the core engine which then are wider than the formal validation specifications of the manufacturer. In an example sequence, after the analysis report is generated, the process continues into reconstruction where any field may be modified or removed where necessary. The file structure can also be exported into an XML format that can be manipulated or changed by a third party and then rebuilt if desired. This type of export format can provide more details of file structure, such as the sequence of the structural elements.

The file binary can be deconstructed to an internal structure and parsed through validation processes with a report being generated. If switched to export mode instead of that final stage where the re-writing to binary occurs, the file can be written through a node mechanism that allows to interrogate structures mapped to XML which is then used to build a DOM (Document Object Model). This can be used to write out the file structure into XML, which is a machine-readable format.

Malware

Malware is a broad term for various types of software or code that can inflict damage to a computer system or network. It includes subtypes of viruses and ransomware. A virus is a type of malware that is designed to infect a computer system or network. Viruses spread via email, social networks or malicious websites or as part of another software program. They can replicate themselves to spread, and/or they can inflict damage to a host computer system. They often try to infiltrate many files and spread to other systems. Once spread, many new viruses can render the operating system unusable.

There are many types of viruses, including the following examples. Armored Viruses obfuscate themselves in protective code to prevent detection. Companion Viruses attach to a legitimate program and then create a program with a different filename extension, thereby getting executed instead of the legitimate program. Macro Viruses leverage Microsoft Office documents that have macros. These viruses will infect documents and spread to other systems. Multipartite Viruses infect the system in multiple ways, often attempting to infest the boot sector, executables and application files. Phage Viruses modify or alter other programs and databases. Polymorphic Viruses change form to avoid detection. Retroviruses will directly attack anti-virus software. Stealth Viruses mask themselves from applications and may attach to the boot sector of the hard-drive.

Other types of malware include the following examples. Ransomware takes control over a system and demands payment to a third party. A Worm is autonomous in its spread over a computer system/network-its purpose is typically to spread. A Trojan is a program that enters the system or network disguised as part of legitimate software. It can then create backdoors, replace valid programs during installation, compromise the security of a system and sometimes exist for years before being detected.

Machine Learning

Machine learning has practical applications in numerous research projects and can serve as a tool deploying useful algorithms for cyber security researchers to solve malware detection. Relying on human effort to remediate the impact of malicious software is no longer feasible. Machine learning technologies are used to detect web pages infested with crypto jacking code, mining threats, traffic patterns and data anomalies. Unsupervised learning has become more frequently used in "anomaly detection." Hackers can use machine learning too, and they often craft phishing emails and create adversarial neural networks to sabotage other artificial intelligence systems. Therefore, it becomes a competition to who will use machine learning more effectively and in a more creative way. The goal of this disclosure is to explain methods for keeping protected systems secure.

Machine learning can be explained as the capability of an information technology system to independently solve problems by identifying trends. Computers can learn from data input and commands, enabling the computer to determine certain items and differentiate between them. Machine learning helps information technology systems identify the trends based on established algorithms and data sets. Historically, instead of using machine learning, decision making problems for a computer program were solved with numerous lines of code constituted out of if—else statements. This approach typically would not scale. If one line of code were changed usually it required code reviews and changes down the line. This approach would also require an experienced programmer who at the same time was an expert in the field of the decision-making problem. Machine learning is more efficient because instead of writing numerous rules, the machine can learn artificially using an algorithm. Artificial knowledge can thus be developed based on a human expert's experience, allowing those experts to use it as a tool without also having years of computer programming experience. Hence machine learning is widely used by scientists, especially in biomedical fields. This also allowed the rise of data science. The first step involving acquiring of artificial knowledge is useful for applications within software architecture. For example, the necessary data and algorithms are advantageously put into the system in advance. It can be helpful to include clear analysis regulations for identifying trends in the data stack.

Efficient machine learning algorithms often automate decision-making processes by generalizing from known examples through "supervised learning." Inputs and desired outputs are provided by the user with the aim that the algorithm provides the wanted output. Classification is the determination of a class of data based on a label predetermined in the dataset. It can be one-class, multiclass or binary. Regression is predicting numbers based on historical sequences of real numbers in mathematical terms.

Examples according to the present disclosure provide solutions to a classification problem (malicious or non-malicious) while also calculating probabilities. Classification can be used to predict a certain class of data. Unsupervised learning solves problems by identifying patterns in the data but without the data being labelled. Examples in this disclosure use supervised learning.

The Classification Problem

Classification can use machine learning algorithms to determine how to allocate a class label to examples from the problem domain using analytical modelling. A class label is forecast for a certain example of input data when the independent variables are in continuous form, and dependent variables are categorical in nature. An example of a classification problem includes providing an input and classifying whether it is spam or not. Five example classification approaches in machine learning include: classification predictive modelling, binary classification, multi-class classification, multi-label classification, and imbalanced classification. The first example, classification predictive modelling, forecasts a class label for a certain example of input data, such as classifying the data as spam or not. Multi-label classification involves tasks having two or more class labels, and one or more classes might not be forecast for each example. For example, in photo classification, a certain photo can have several objects on the same scene. An approach can forecast the existence of several known objects in the photo, such as a house. Multi-class classification is the classification task with more than two class labels with no normal or abnormal results.

In binary classification, outcomes have two possible labels. For example, email spam recognition (spam or not spam) churn prediction (churn or not churn), and conversion prediction (whether buying or not). Binary classification can mainly comprise a single class (the normal state, and the abnormal state). For example, 'cancer not detected' is the normal state in a health test, and 'cancer detected' is the abnormal state in a health test. The normal state class is usually allocated class label 0, while the abnormal state class is allocated class label 1. A model that forecasts a Bernoulli probability distribution for every example can be used to achieve binary classification. The Bernoulli distribution is a separate probability distribution that can cover a situation that on occasion will have a binary result as either 0 or 1. Thus, models can forecast a probability for an example that belongs to class 1 or the abnormal state. A common problem with classification and other machine learning algorithms is when an algorithm overfits or underfits. Overfitting occurs when an algorithm is trained with a certain dataset and makes accurate predictions on the same data, but does not generalize well enough for new unseen data. Underfitting is when an algorithm generalizes too extensively and captures a lot of unseen data, but at the expense of accuracy and precision. The most common algorithms used as binary classifiers include linear models, logistic regression, naive Bayes, k-Nearest Neighbors, decision trees, ensemble classifiers, and support vector machines.

Linear Models—Logistic Regression and Linear Support Vector Machine

Logistic (or sigmoid) regression can be used to resolve classification problems. Statisticians established it to explain the feature of population development in ecology, increasing fast and maxing out at the environment's carrying ability. It has an S-shaped (sigmoid) arch that can accommodate any real-valued number between 0 and 1 (but is undefined specifically at 0 or 1). It has the formula of $y=1/(1+\hat{}\text{-value})$, where "e" is the base of the natural logarithm and "value" is the real numerical value that needs to be changed. Input values (x) are joined linearly through weights or coefficient values (e.g. value=$W_0+W_1x$) to forecast an outcome value (y). The main difference from linear regression is that the modelled outcome value is binary (0 or 1). For example, when identifying people's sex as either male or female, from their weight, the first class should be male, and the logistic regression model can be identified as the probability of male provided the individual's weight or more. Forecasting changes to probabilities into binary values (0 or 1). Logistic regression is a linear process, but predictions are changed through a logistic function. A benefit of logistic regression is that it also introduces explainability—it can compute coefficients. Coefficients hold value in the process of estimation because they have an index and a numerical magnitude.

K-Nearest Neighbours

K-Nearest Neighbours (KNN) is one of the simplest machine learning algorithms. KNN is a modest, easy-to-implement controlled machine learning algorithm applied to resolve classification and regression problems. KNN depends on input data to understand a function which yields a suitable output when assigned fresh unlabeled data. It is an ordinary practice to symbolize a classification algorithm's label as numeral numbers like 1, −1, or 0, where the numbers are completely symbolic. KNN assumes that common items exist near each other. It will find the closest training data point (closest neighbour) to the point we want to make a prediction for. The number of datapoints used for the prediction can be modified to tune the algorithm in case of over or underfitting. Those datapoints are called "neighbours." The downside is that it does not perform well on multidimensional data (data with many features). It is a good baseline algorithm to try before moving on to more complex algorithms. This classifier is good because there is no need for assumptions, and the algorithm is adaptable, modest, and easy to implement.

Decision Trees

Decision Trees are highly accurate models that essentially replicate the if-else hierarchy used historically instead of machine learning. Decision trees are a topology for supervised machine learning where data is constantly divided depending on a specific parameter. Decision Trees comprise decision nodes where data is divided into roots, branches, and leaves, which are the ultimate results. For example, when trying to calculate an individual's fitness provided with information like their age and eating habits, the decision nodes will be queries like the individual's age or what they eat. The leaves will be the individual fit or unfit or be yes, no, or continuous (not yet decided). As a result, the decision tree usually starts from the root when forecasting a class label for an input. Decision trees commonly over fit-meaning they can be 100% accurate on the training data but they do not perform well on new real-time data. Ensemble algorithms are an example solution to this problem.

Ensemble Algorithms—Random Forest and Gradient Boosted Classifiers

Ensemble algorithms combine multiple machine algorithms to achieve better performance. Random forests and gradient boosted algorithms are powerful in this category. They are essentially a collection of trees with various degrees of overfitting with averaged results for better performance. Random forests perform by creating multiple decision trees at preparation time and outputting the class. There is no contact or logical contamination between the trees because they exist parallel to each other. There is randomness amongst the trees. The gradient boosted regression tree is another ensemble method that combines multiple decision trees to create a more powerful model. They can be used for regression or classification. Unlike random forest where the trees are parallel, in the gradient boosted algorithms the trees are built in a sequence. Strong pre-pruning is used in these algorithms, without randomization. Very shallow trees are often used, of depth one to five, which is economical in terms of memory and makes predictions faster.

Support Vector Machine

Support vector machine (SVM) is a controlled machine learning algorithm applied for classification and regression problems, although it is mostly applied to classification challenges. An SVM main goal is to plot the hyperplanes of the different data places with the biggest border or with more space between the distributing line and any given place. Each data element is plotted in n-dimensional space, where every property's value becomes the value of specific coordinates. An SVM classifier can be visualized as fitting the widest possible street (represented by the parallel dashed lines) between the classes. This is called large margin classification. An SVM kernel helps to change smaller dimensional input to greater dimensional space. SVM is well suited for complex but small to medium datasets.

Machine Learning and Malware Detection

As hackers advance their skills and technologies, malware increases in complexity. It has become a new challenge to identify unknown types of malware and binary machine learning classification seems to be a technology that can keep up with this evolution. Also, in solving this problem of identifying new types of malware it is important that the algorithms do not over fit. Overfitting is a problem in machine learning that occurs when the algorithm is too "good" and accurate for the real-world data and it does not generalize, therefore it will do well on the test sets, but it will fail to provide good results with fresh real-time data. Machine learning has proven useful in static malware analysis.

Malware analysis can be divided into static and dynamic, depending on if the code is being executed (dynamic) or not (static). Neural networks can classify malware using static analysis, by simply using datasets constructed of information from portable executable files (PE files). Malware classification based on dynamic analysis on the other hand analyzes the behavior during execution. The features of that behavior are used to compile a dataset fed to machine learning algorithms. Analyzing API calls within a certain time is an example of using dynamic analysis. Some methods may implement a hybrid between dynamic and static analysis. Machine learning may also be leveraged to classify malware using image processing techniques. File binaries may be turned into grayscale and analyzed by neural networks and classical machine learning algorithms.

Three developments undergird machine learning in malware identification. The first development is availability of labelled malware datasets. The second development is increase of computational power, enabling larger amounts of data and processes being iterated by the machine learning algorithms. The third development is improvement in machine learning algorithms to produce better accuracy and scalability on a wide range of tasks. Comparative machine learning approaches to malware detection include methods that: engineer features in order to extract a feature vector representing the executable file; have the grey scale representation of an executable as the input; are fed with the sequence of API function invocations; model a program as a sequence of instructions; represent a program as a sequence of bytes; and/or aim to classify a program from its network traffic. Dtrace can be used to compile a dataset digested by machine learning algorithms. Dtrace is a dynamic tracing framework, developed for application and kernel troubleshooting. One study compiled a dataset from call sequences of benign and malicious code. It achieved a 0.97 accuracy, 0.91 Recall, Precision and F1 score with the Random Forest Classifier. A behavioral approach can be used for malware analysis by evaluating the relationships between the API frequencies in known malicious and benign software samples. Although some examples detected malware with an accuracy of almost 100%, this may indicate over fit. The approach can be subject to varying accuracy depending on the datasets and algorithms selected.

To show machine learning methods that operate post CDR analysis can be used to detect unknown malware, examples of the present disclosure approaches this as a machine learning binary classification problem. According to an example, a dataset is formed from an internal pool of CDR analysis reports of benign and malicious files. Those files may be labelled O or 1 depending if benign or malicious. Algorithms are trained to predict if features of a certain file parsed through would indicate if the file would be malicious or not. The algorithm's capabilities are also used to predict probabilities. That allows determination of file risk in the test data, which is scored 0-1 and can be translated into a percentage. Explainability scoring is also used, with values that prove a direct link between the issues sparked in CDR analysis and malware.

Three separate examples are described: one with a classical test and train set where 80% of the files were used for training and 20% files were used for testing, a cross-validation example and an example with SHAP values and feature importances. The purpose of the first example was to get a basic overview of the data, try out some basic algorithms and get a sense of what the results will be. The second example was done with cross validation. Cross validation is a more robust way to score an algorithm and assess how well it generalizes to new data. It gives a more representative overview of results across the board throughout the dataset which then allows the data to be re-used in re-training the algorithms with all the data. This method is deemed to replicate real-time conditions more accurately and it improves randomization of the data. A dataset is shuffled and split into groups called folds where k is the number of the folds. Therefore, this is often called k-fold cross-validation. Each fold gets split into training and testing data. The algorithm gets trained on the train set from the first fold and tested on the test set. This same process gets repeated for every fold. In some examples, 5 folds were deemed enough comparing to the number of files in the dataset.

Research and Programming Environment

Python may be used for some of the disclosed examples. Python is a coding language that is used widely due to its simplicity and ease of use. It does not have strict syntax rules. It combines the power of general-purpose programming languages with the case of use of domain-specific scripting languages like MATLAB or R. With its vast toolbox of libraries Python was the ultimate language for this research. The described examples used its libraries for data loading, wrangling and analysis (Pandas), statistics and mathematical matrices (Numpy), machine learning (Scikit-Learn), plotting (Seaborn and Matplotlib) and more. One of the main advantages in using Python for machine learning is the ability to be used in a visualization environment like Jupyter Notebooks. Machine learning and data analysis are fundamentally iterative processes, in which the data drives the analysis. Tools that allow quick iteration and easy interaction are especially useful for the described applications. Jupyter Notebooks allow every line of code to be executed and visualized.

The Dataset

Figure 3:
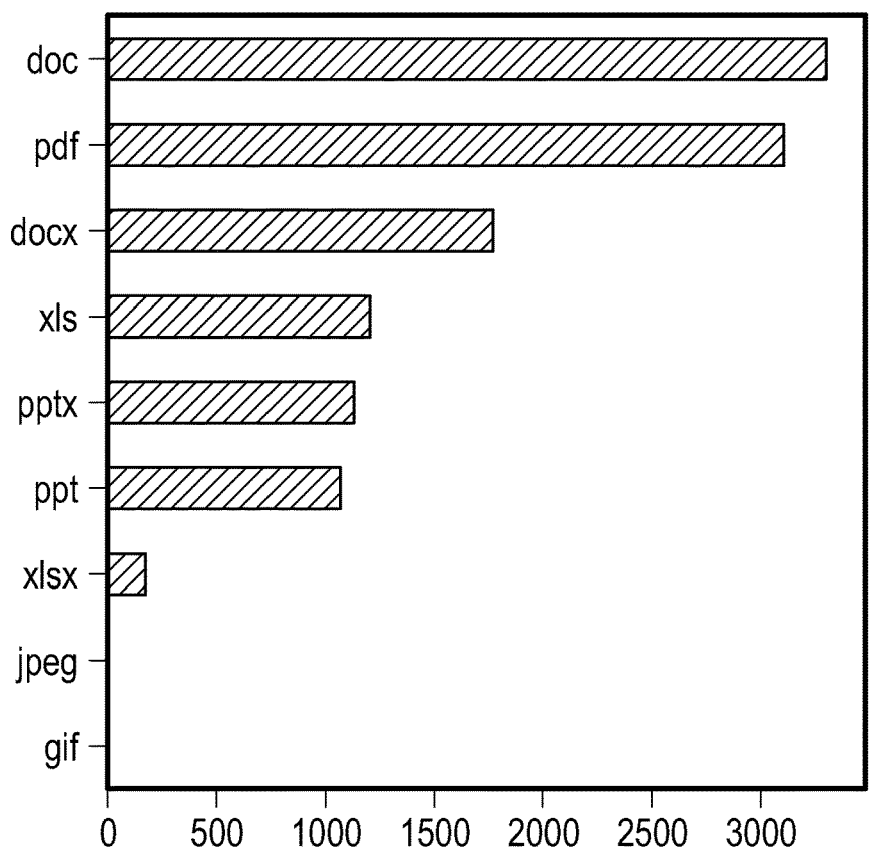
FIG. 3 shows a plotted file type distribution in dataset.

In examples described here, the dataset was formed from 11830 files used for internal quality assurance (QA) testing. These were parsed through the Glasswall CDR core engine. There were two pools of files: malicious and non-malicious. The hashes were scanned and confirmed by the antivirus tool Virus Total. 6563 files were confirmed malicious and 5267 considered non-malicious files, forming a relatively balanced dataset. The CDR process generated analysis reports in Extensible Markup Language (XML) format. The table below shows file types that were analyzed, and FIG. 3 plots this file type distribution.

TABLE 1

File Types Analyzed

| File type | Number of files analyzed |
| --- | --- |
| doc | 3313 |
| pdf | 3120 |
| docx | 1784 |
| xls | 1216 |
| pptx | 1140 |
| ppt | 1074 |
| xlsx | 176 |
| jpeg | 5 |
| gif | 2 |

The XML reports were imported into a Python script that extracted the features of every file from the reports and exported it into a CSV (comma-separated values) file format. Feature selection from the reports can be based on whether the file content and structure reflected in the XML report is likely correlated or known to correlate (e.g., directly) with malware presence. Because the Issue ID and remediations CDR outputs (as reflected in XML reports) reflect the difference between the file type specifications (e.g., from the vendor or creator of the file type) and the actual analyzed file, and files can be weaponized through their content items, these CDR outputs were believed to hold potential correlation value for the machine learning algorithm. The file type is useful because previous empirical studies have shown statistically that some file types hold malware more frequently than others. (Because some files "masquerade" as a different file type—e.g., when a hacker replaces the ".exe" file name extension with a ".pdf" to make a file seem less suspicious-a CDR engine advantageously does not rely only on a purported file extension to determine a file type but independently evaluates other file properties). Accordingly, the features that were extracted were issue ID ranges, file content, number of remediations and filetype. An issue ID is a 32-bit unsigned integer composed of camera ID (1 byte), group ID (1 byte), and error ID (2 bytes). Each type of issue corresponds to a large group of specific issue IDs. The issue ID ranges were chosen rather than issue IDs since the individual issue IDs are in large numbers (millions) and it would not be suitable for a machine learning dataset as the data would not generalize well enough in relation to new data coming in. The issue ID ranges were generated by grouping by the types of issues that the core engine detects in relation to the file structure. The issue ID ranges were logged in an XML file and mapped to (e.g., related to) content details. For example, potential problems categorized as "excel data table instances" are numerous; the Glass Wall CDR engine assigns issue IDs (as labels) to these potential problems within the specific range of issue IDs, for example between 35389490 and 35454975. Thus, this issue ID range was correlated with the more descriptive "excel data table instances," creating a taxonomy that correlates numbers with particular artifact types in the file content. Because the error ID (a component of the issue ID) is specific to the camera and the camera ID changes depending on the file format, the individual issue IDs are related to the particular camera and issue ID range instance, and are therefore very specific for the individual file. (Thus, it is unlikely for a particular issue ID to recur-hence the greater usefulness of the broader category of issue ID ranges for use in the machine learning process). The file content imported was dynamic data exchange, embedded files, embedded images, external and internal hyperlinks, macros, metadata, review comments, acroform, actions (all) and javascript.

By using the Jupyter Notebooks Integrated Development Environment (IDE), the dataset was loaded as a pandas dataframe for further wrangling. The malicious and non-malicious datasets were concatenated into one dataset. Every file was represented with a row and had columns as features. The features were mainly categorical (i.e. variables that contain label values rather than numeric values) so for the dataset to be digestible by the classifiers they were one-hot encoded which means that a 0 was allocated if the feature was absent or 1 if the feature was present. Any number greater than 1 meant that the certain feature appeared multiple times in the same file. All the files were labelled with 0 for non-malicious and 1 for malicious-which was also represented as a column. The dataset was then ready to be used for training and testing. Python's Scikit-Learn library may be used.

The Machine Learning Algorithm Selection and Training

The described example methods used the following algorithms: K-nearest neighbors, logistic regression, random forest, boosted gradient and linear SVM. KNN was used as a baseline algorithm to test the dataset due to its simplicity and reasonable performance. As the purpose of the algorithm is to recognize unknown malware, one goal was to generalize well. Therefore, the Naive Bayes algorithm was not used in initial examples because it does not generalize as well as logistic regression and linear SVM. The benefit of using logistic regression is that coefficients (i.e. indicators of feature importance) can be calculated. This has particular value in threat intelligence. The linear SVM model was selected over the SVM Kernel model due to the size of the dataset. Linear models generally perform better on larger datasets. Decision trees can also be used, but to reduce the risk of overfitting. the described examples use ensemble methods. In an example, Random forest (RF) was chosen. RF can provide the accuracy of decision trees without the deficiencies. RF also can be used to extract feature importances from the dataset, which was desirable for this methodology. Feature importances are values from 0-1 that rate how important each feature is to the algorithm. This goes a long way in machine learning explainability. By extracting file content or Issue ID ranges that were statistically important, we can link those to malware and the file structure. The way the computation works is that the features that are more important are located close to the root of the tree while the non-important ones are in the leaves, or do not appear at all. Boosted gradient algorithms are also very powerful like decision trees and reduce or eliminate the problem of overfitting. They also can compute feature importances. This disclosure differentiates feature importances from coefficients in the case of logistic regression. Coefficients are always positive values and do not encode which class a feature indicates.

Logistic regression, random forest and boosted gradient algorithms all have a function in Scikit-Learn to predict probabilities and can be used for predicting the risk of a file in this scenario. Therefore, once a file is classified as 0 or 1, the classifiers can give a percentage of the likelihood that the prediction is accurate. This is an innovative type of file risk rating done by machine learning. Another additional value that ensembles provide in this scenario is that, when trained, they can be used to calculate SHAP values (SHapley Additive explanations). The SHAP framework addresses a balance between accuracy and interpretability of machine learning models. The SHAP framework assigns each feature an importance value for a particular prediction and identifies the class of additive feature importance. It shows there is a unique solution in this class that adheres to desirable properties. The new class unifies six existing methods, notable because several recent methods in the class lack the proposed desirable properties. This new method is derived from Game Theory and shows improved computational performance and/or better consistency with human intuition than previous approaches.

Neural Networks can also be used. In some examples, neural network results may not have been better than other examples of the present disclosure, because the features were numerical and the complexity was still handled very well by the described algorithms.

All the above-mentioned algorithms were trained on the same data. In the first example the algorithms were trained with 80% of the dataset and tested with 20%. The training of each algorithm was computationally expensive due to the complexity and size of the dataset.

Scoring

In the first two examples, the following scoring metrics were applied: accuracy, precision, recall, area under the curve (AUC) score. These metrics were calculated from the true-positives (TP), true-negative (TN), false-positive (FP) and false-negative (FN) predictions. For based on the score of every algorithm a confusion matrix was created with the TN, TP, FN, and FP absolute numbers. Each row in a confusion matrix is there to represent an actual class, each column elicits the predicted class. This evaluation was done in the first example to aid algorithm selection for further cross-validation. Confusion matrices are an industry standard and commonly used in algorithm selection.

Figure 4:
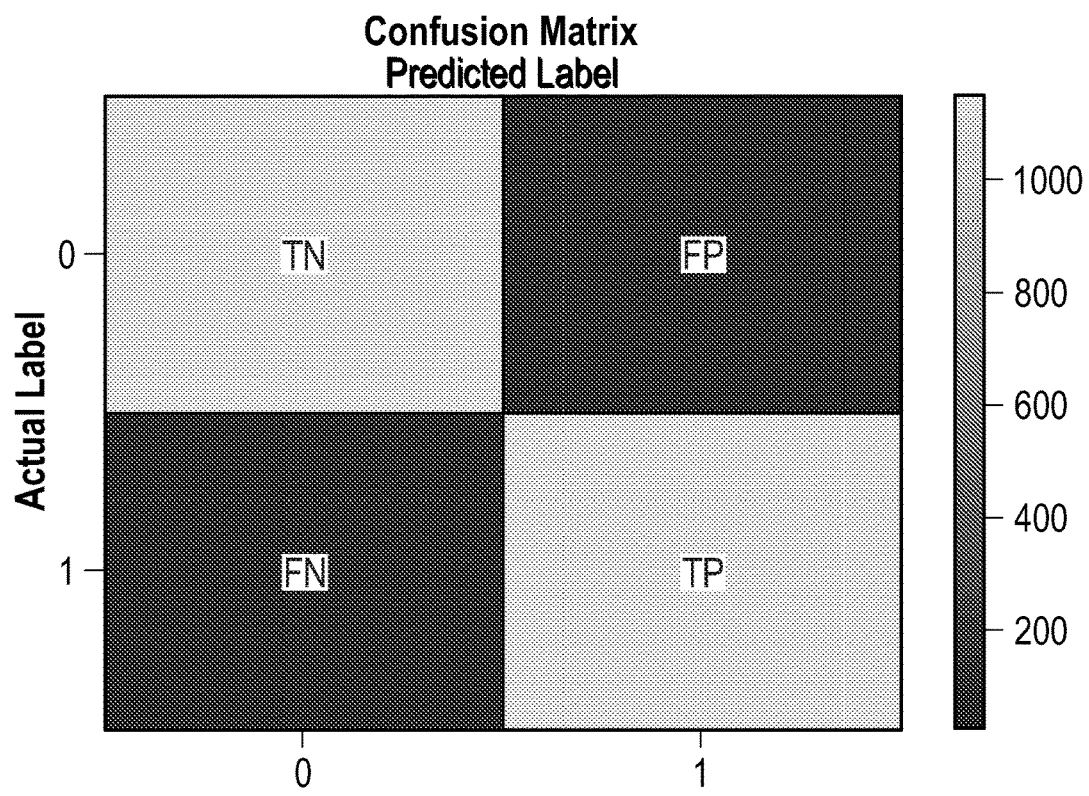
FIG. 4 shows a sample Confusion Matrix.

FIG. 4 shows an ideal look of the confusion matrix for this study. Ideally, we would like to have the TP and TN fields containing the majority of the files, therefore, to have a lighter color consistent with the top of the scale shown. The wrongful predictions fields FN and FP should ideally have a darker color, consistent with the bottom of the scale shown at the right. For more accurate and precise performance metrics we use accuracy, recall, F1-score, AUC (area under the curve) score and precision.

Accuracy is a number between O and 1 that can be expressed as percentage of correct predictions. It is the sum of correct predictions (TP and TN) divided by the number of all the samples.

$$Accuracy = TP + TN/TP + TN$$

Precision indicates how many of the predictions deemed positive are actually positive.

$$Precision = TP/TP + FP$$

Recall, which is often called sensitivity in biomedical science, captures how many positive samples are captured by the positive predictions.

$$Recall = TP/TP + FN$$

As demonstrated by the formula above, the larger the number of false-negatives the smaller the recall is. In examples disclosed herein it is useful to capture malware to avoid infecting a protected system. It is often used when it is important to capture all positive samples and avoid false-negatives (i.e., breast cancer studies). In some situations, there is a trade-off between precision and recall. The algorithm of choice typically scores higher on the desired metric depending on the scope of the research. In this case, recall holds more value than precision.

The $F_1$-score is a summary of the recall and precision relationship (the harmonic mean of the two measures) and it is often used as a performance metric in imbalanced datasets. For the Fr score to rise, both precision and recall ratios must increase.

$$F_1 = 2 \cdot (precision \cdot recall/precision + recall)$$

The receiver operating characteristics curve (ROC) considers all possible thresholds for a classifier and shows the false-positive rate (FPR) versus the true-positive rate (TPR) or more commonly called recall.

$$FPR = FP/FP + TN$$

The ideal curve should be located top left as ideally, we are looking for a classifier with high recall and low false positive rates. A summary of the curve is represented in the metric called AUC score which is calculated with the roc_auc_score function. This function calculates the Area Under the Curve for the Receiver Operator Characteristic graph, a graph which summarizes the performance of a classifier over all possible probability thresholds. The ROC graph is generated by plotting a true positive rate (TPR) on the vertical axis against false positive rate (FPR) on the horizontal axis, while varying the threshold value used for assigning observations to a given class. Better models have a larger ROC AUC score.

Example One Results

The first example used logistic regression, K-nearest neighbours, random forest, linear SVM and the XG boost algorithm (a Python implementation of the boosted gradient algorithm). The dataset was split into a training and testing set. The evaluation was done on the testing set which was 20% of the whole data (for further details see the methodology chapter).

The logistic regression algorithm from Scikit-Learn was loaded and the 'saga' solver was used due to the size of the dataset. The logistic regression algorithm did not seem to elicit desirable results. It did very poorly in recognizing the malicious files with a recall of only 0.12 for the malicious class. The accuracy was also very poor at 0.51 which is not better than random guessing. The AUC score was 0.55 which alluded that the algorithm was not adequate for this data and further experimentation is required.

TABLE 3

LR Classification Report

|   | precision | recall | f1-score | support |
|---|-----------|--------|----------|---------|
| 0 | 0.47 | 0.98 | 0.64 | 1053 |
| 1 | 0.89 | 0.12 | 0.22 | 1313 |
| accuracy | | | 0.51 | 2366 |
| macro avg | 0.68 | 0.55 | 0.43 | 2366 |
| weighted avg | 0.71 | 0.51 | 0.41 | 2366 |

Figure 5:
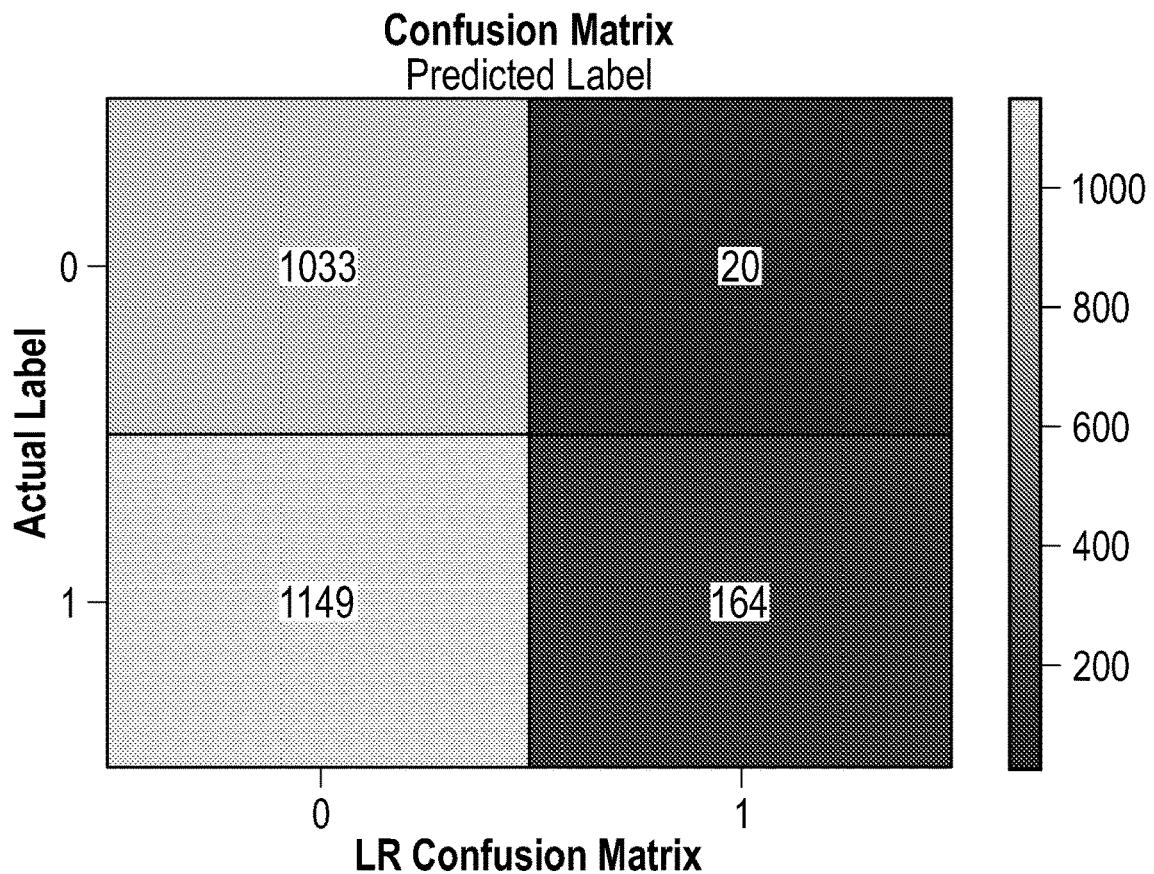
FIG. 5 shows a LR Confusion Matrix.

FIG. 5 shows the confusion matrix. The results may yield low confidence in this To calculate uncertainty levels, the probabilities of every estimation were calculated algorithm.

Figure 6:
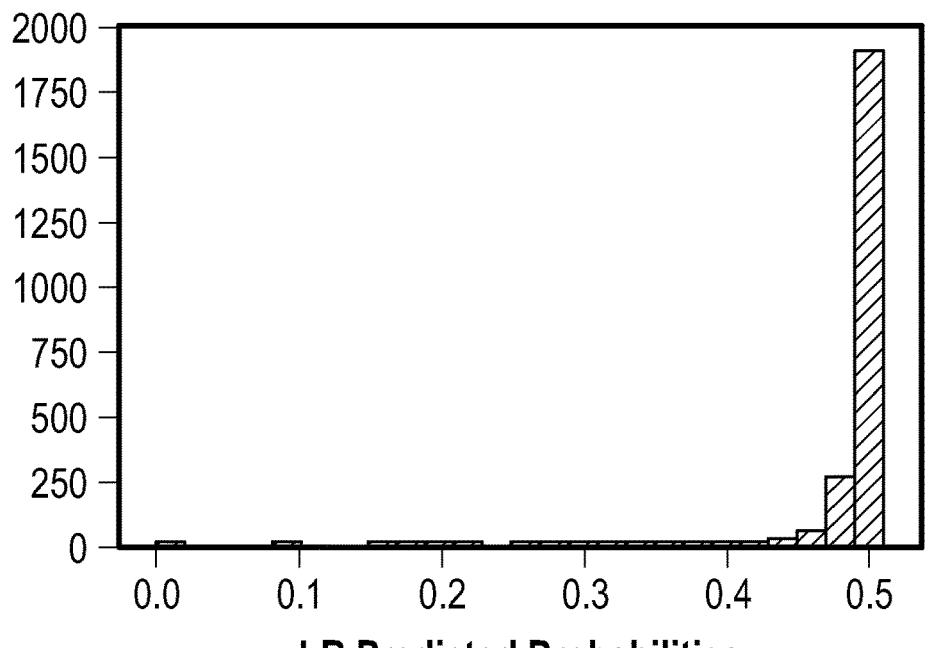
FIG. 6 shows a LR Predicted probabilities.

To calculate uncertainty levels, the probabilities of every estimation were calculated and plotted, as seen in FIG. 6. On the y-axis we see the number of files, and the x-axis represents the certainty that these files are malicious. In the example data of FIG. 6, the algorithm does not make any predictions for the malicious class with a certainty level above 60%.

Figure 7:
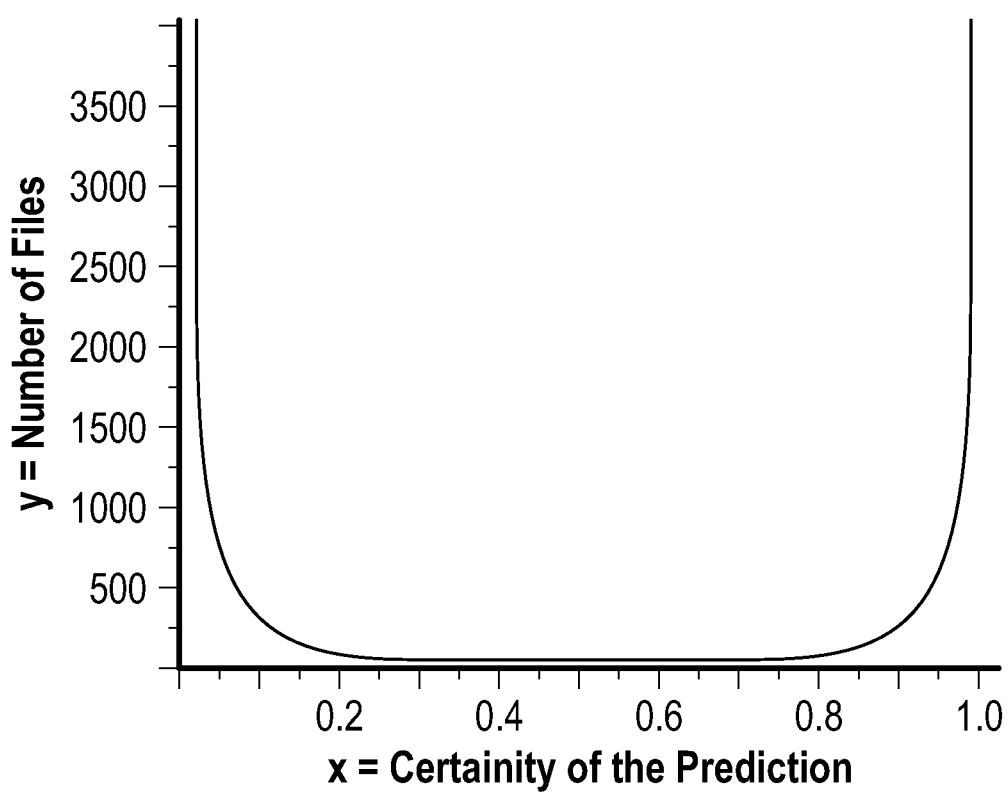
FIG. 7 shows a desired arcsine distribution of uncertainty.

FIG. 7 shows a desired arcsine distribution of uncertainty. Ideally the probability mapping of the algorithm when plotted should demonstrate an arcsine distribution. If we imagine the x-axis being 0-1 (0-100% certainty of a prediction that the file is malicious) the ideal algorithm would classify the majority of files of being malicious with either very little to ideally no certainty (which means they are clearly non-malicious) or with a high percentage of certainty giving us confidence those files are not false, positives but clearly in the malicious class. In contrast to the ideal shown in FIG. 7, FIG. 6 (LR) is predicting more with a normal distribution curve therefore it will not serve the purpose of determining the risk of a file.

Figure 8:
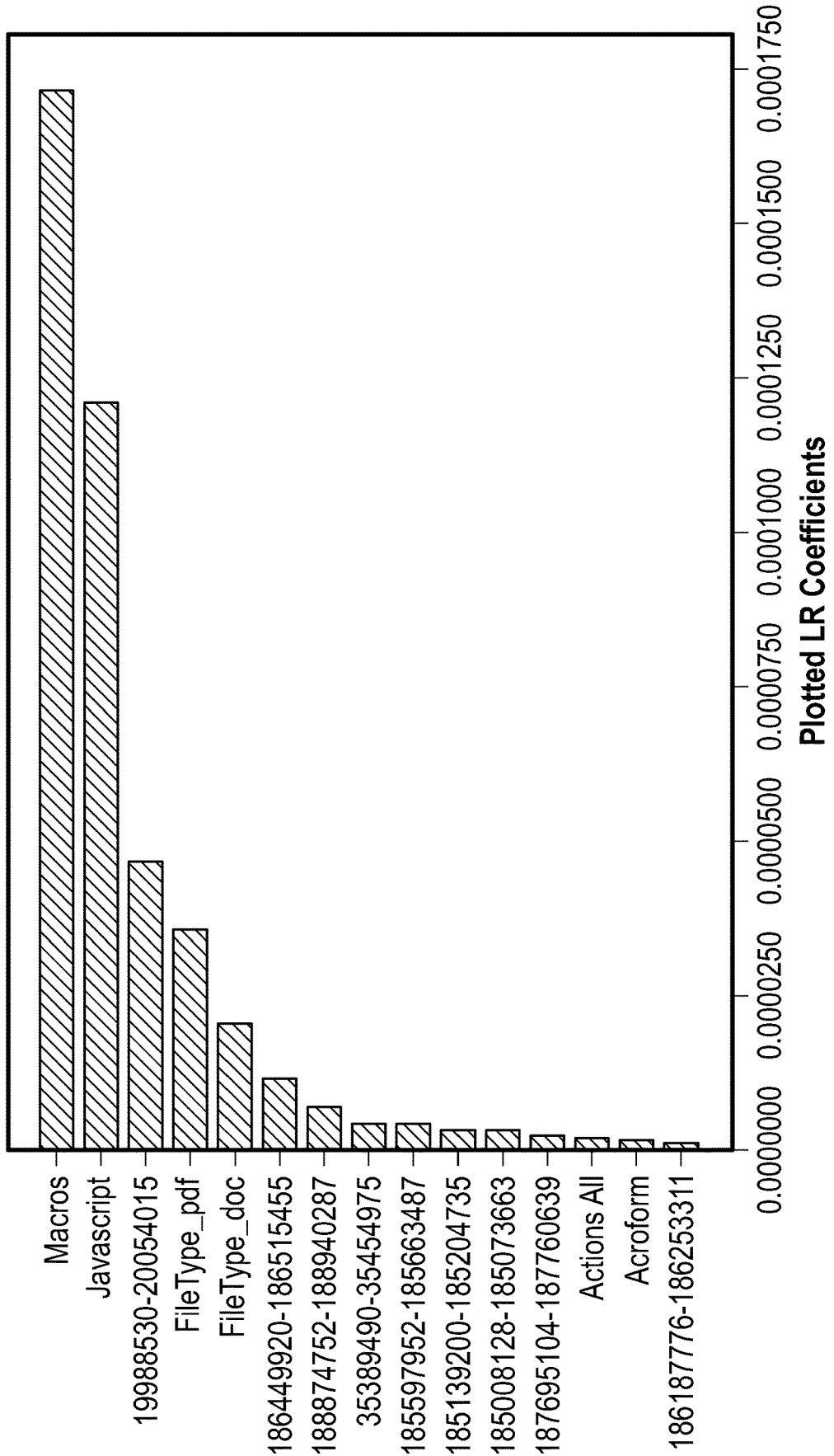
FIG. 8 shows plotted LR Coefficients.

Despite the poor algorithm performance, it is interesting to plot the coefficients of correlation to get an idea of potential important features in the dataset. FIG. 8 shows a plot of the 15 coefficients. The file content, file type and a few issue ID ranges stood out. The highest ranked range was 19988530-20054015 which can be mapped to the "File Information Block Instances," a type of metadata found in the document. Running LR was computationally expensive as it required a couple of hours for the training.

Linear SVM Results

The SVM algorithm was loaded from Sci-Kit Learn. For this the Linear kernel was used with the probability function set to true to enable uncertainty predictions. Unlike logistic regression SVM yielded much more desirable results with the dataset. This was expected as SVM is designed to compute multidimensional data. A classification report and confusion matrix were printed. The accuracy on the test set was 0.89 with an impressive recall of 0.90 for the malicious files. This indicated that the algorithm performed well to recognize malicious files and had a low FN rate, which is a desirable outcome:

TABLE 4

SVM Classification Report

|   | precision | recall | f1-score | support |
|---|-----------|--------|----------|---------|
| 0 | 0.88 | 0.88 | 0.88 | 1053 |
| 1 | 0.90 | 0.90 | 0.90 | 1313 |
| accuracy | | | 0.89 | 2366 |
| macro avg | 0.89 | 0.89 | 0.89 | 2366 |
| weighted avg | 0.89 | 0.89 | 0.89 | 2366 |

The ROC AUC score for SVM is −0.8902851823643902

Figure 9:
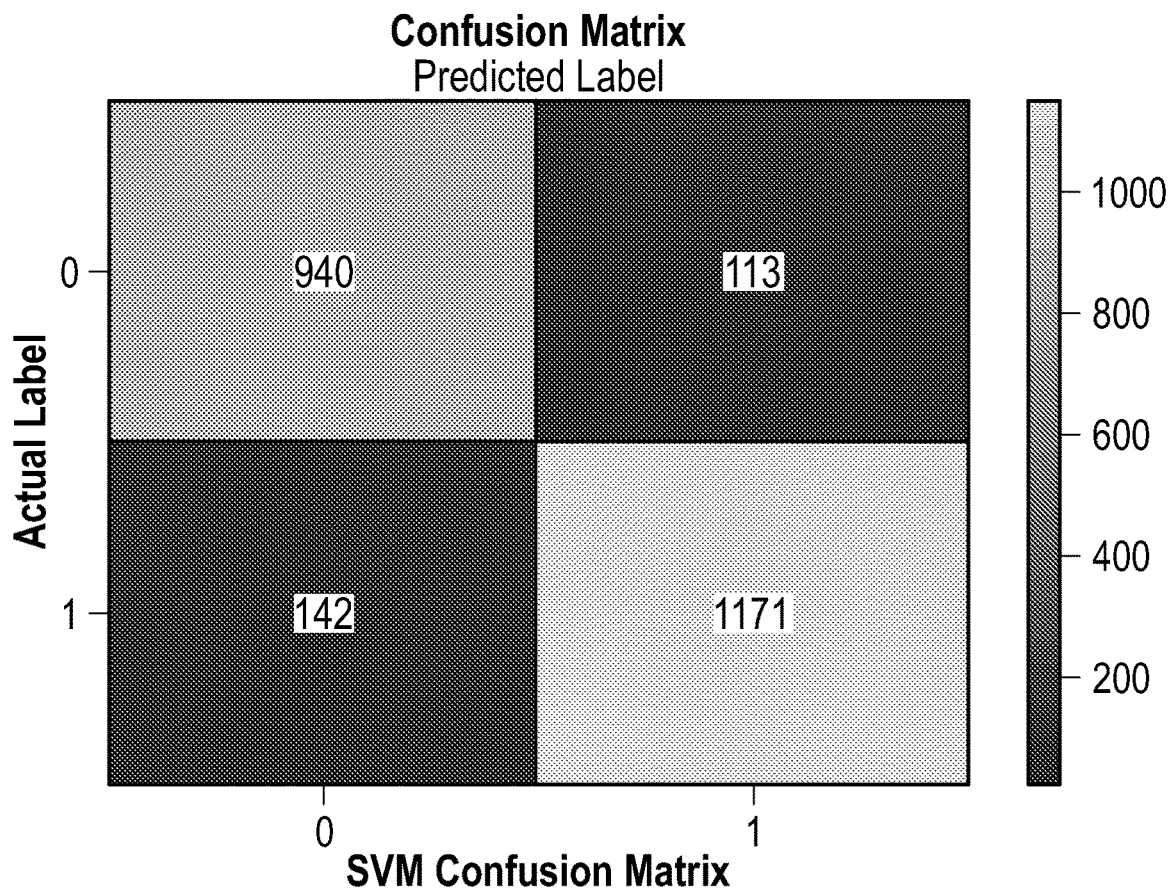
FIG. 9 shows SVM Predicted probabilities.

FIG. 9 shows the SVM confusion matrix. Overall, the performance of SVM is satisfactory: the confusion matrix looks promising and also there is a solid 0.89 ROC AUC score and accuracy.

Figure 10:
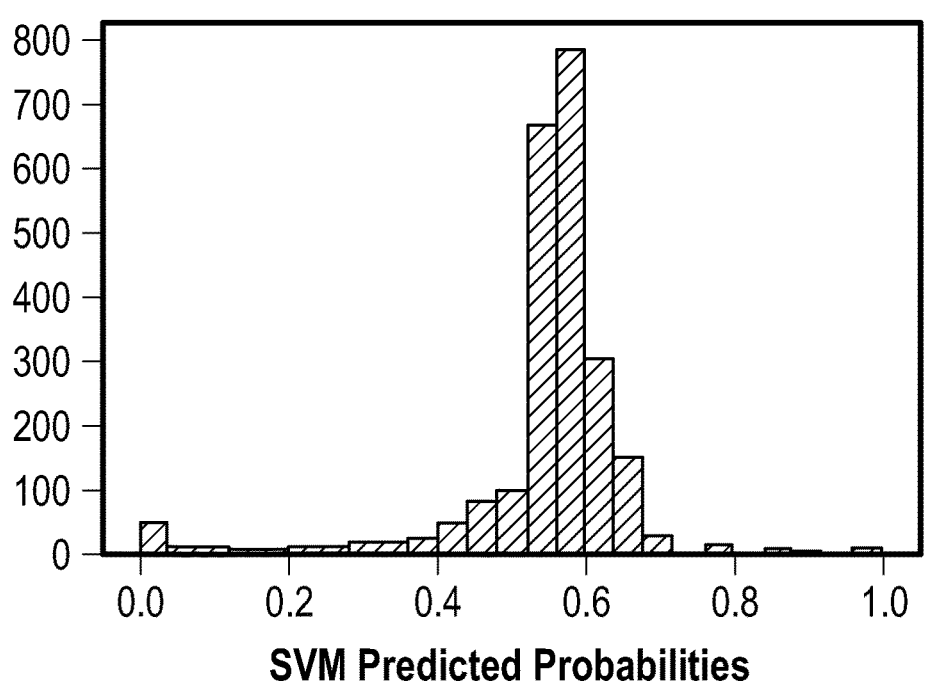
FIG. 10 shows a SVM Confusion Matrix.

FIG. 10 shows the SVM predicted probabilities, which are less promising. The probabilities of all the files being malicious were calculated. The algorithm predicted a larger number of non-malicious files with more certainty, but most of the uncertainty predictions were conglomerated around 40-60%, which is not ideal for predicting the risk of a file.

KNN Results

The KNN algorithm was used as it is a simple, easy to use computationally economical algorithm. It tends to yield solid results on various types of data. The number of neighbors chosen was 10 to yield good precision and accuracy without over-fitting. The accuracy was 0.92, recall for malicious files 0.88 and AUC score was 0.92. SVM still outperforms KNN on these metrics.

TABLE 1

KNN Classification report

|   | precision | recall | f1-score | support |
|---|-----------|--------|----------|---------|
| 0 | 0.87 | 0.96 | 0.91 | 1053 |
| 1 | 0.97 | 0.88 | 0.92 | 1313 |
| accuracy | | | 0.92 | 2366 |
| macro avg | 0.92 | 0.92 | 0.92 | 2366 |
| weighted avg | 0.92 | 0.92 | 0.92 | 2366 |

The ROC AUC score for KNN is −0.9226491025170894

Figure 11:
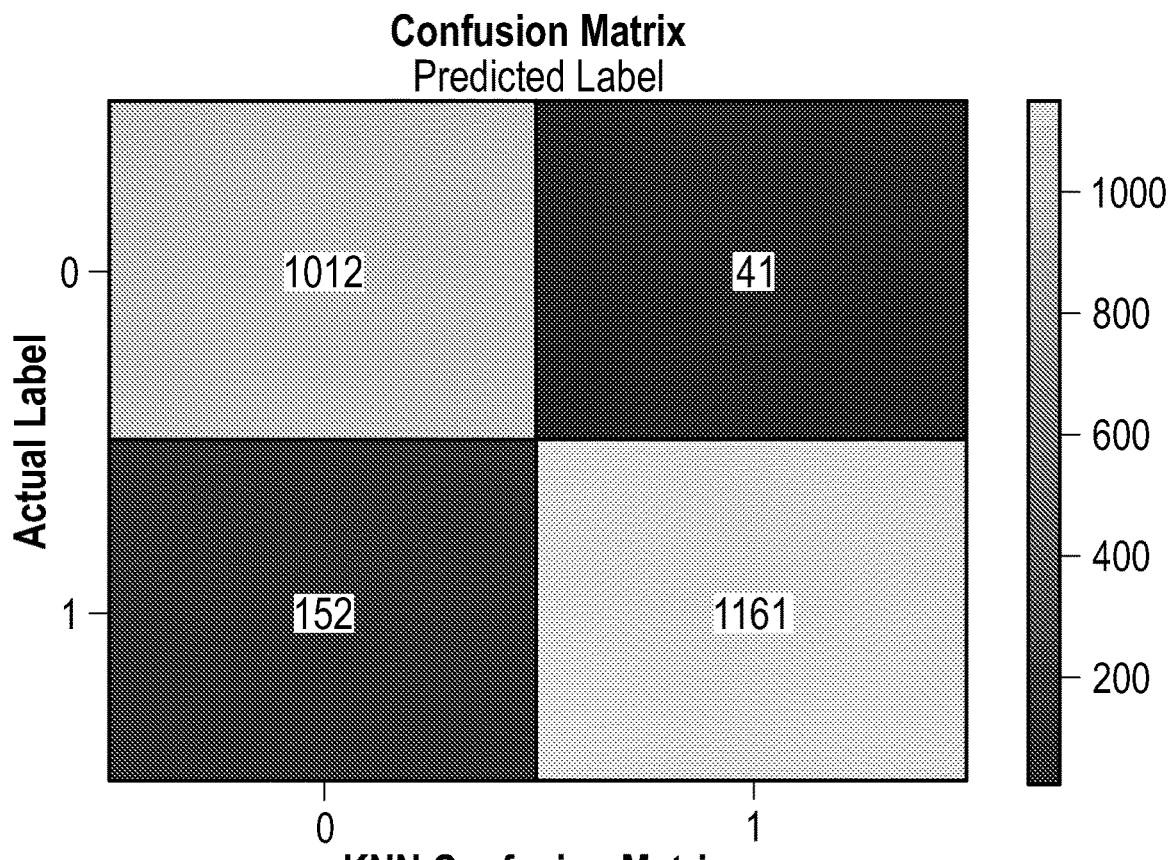
FIG. 11 shows a KNN Confusion Matrix.

FIG. 11 shows the KNN confusion matrix. It looks desirable, but the one for SVM implies better performance than KNN, according to the example data of FIG. 11.

Figure 12:
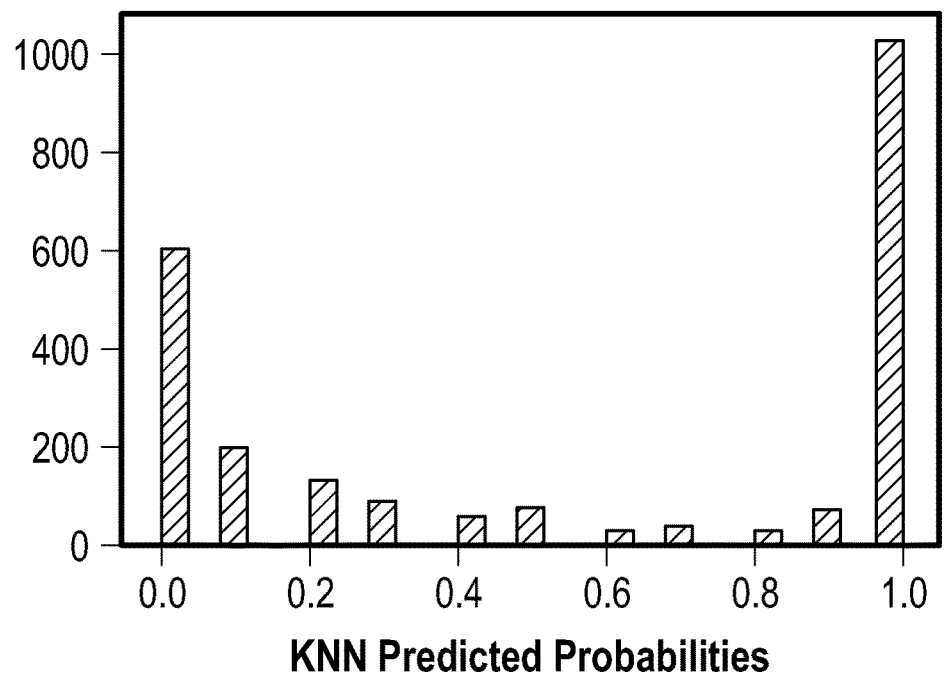
FIG. 12 shows KNN Predicted probabilities.

FIG. 12 shows the KNN predicted probabilities. The probabilities do form an arcsine curve and this demonstrates that the KNN algorithm can be used to assess the risk of a file.

Random Forest Results

Random forest is imported with Scikit-Learn and default parameters. It yields good results. The accuracy is 0.94, AUC score 0.94 and recall 0.95 for malicious files:

TABLE 2

RF Classification Report

|  | precision | recall | f1-score | support |
|---|---|---|---|---|
| 0 | 0.93 | 0.94 | 0.94 | 1053 |
| 1 | 0.95 | 0.95 | 0.95 | 1313 |
| accuracy |  |  | 0.94 | 2366 |
| macro avg | 0.94 | 0.94 | 0.94 | 2366 |
| weighted avg | 0.94 | 0.94 | 0.94 | 2366 |

The ROC AUC score for RFC is –0.9420984833526088

The Random Forest (RF) results outperform the SVM algorithm in the desired metrics domain.

Figure 13:
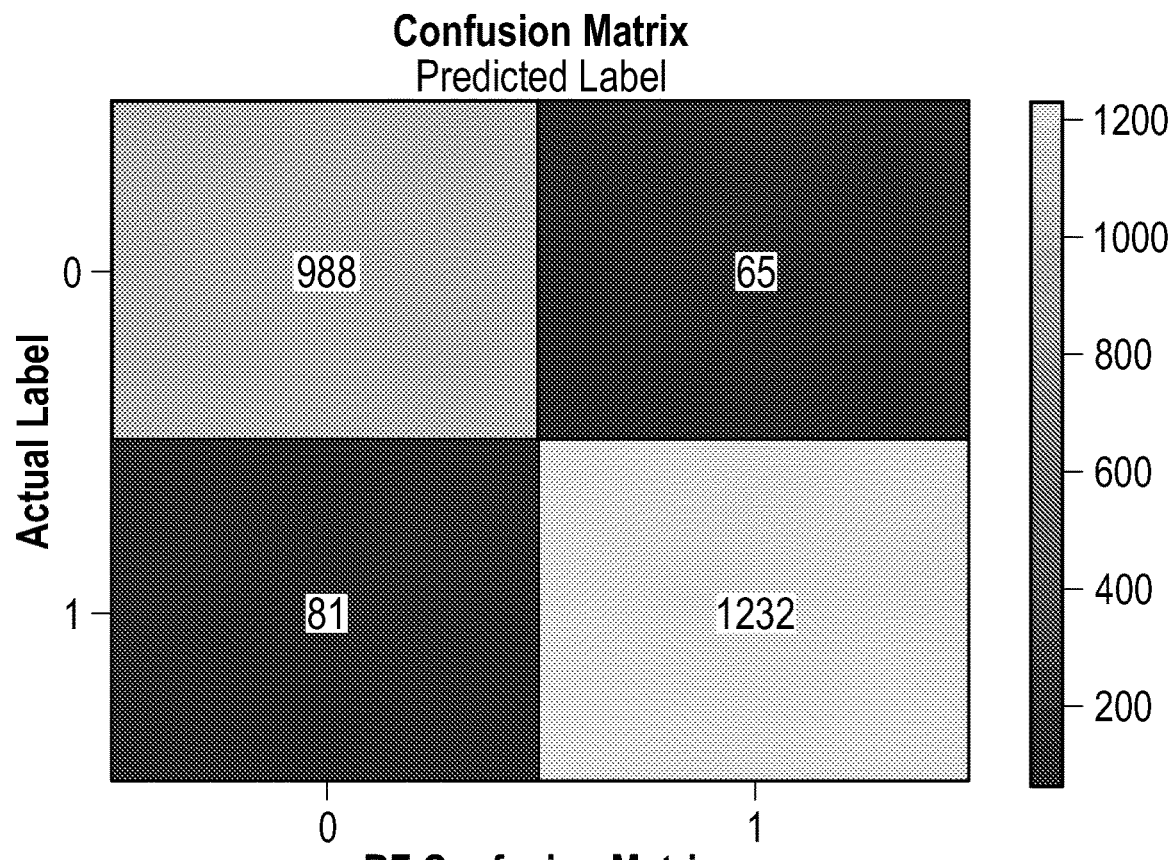
FIG. 13 shows a RF Confusion Matrix.

FIG. 13 shows the RF confusion matrix, which has the desired color coding according to examples of the present disclosure.

Figure 14:
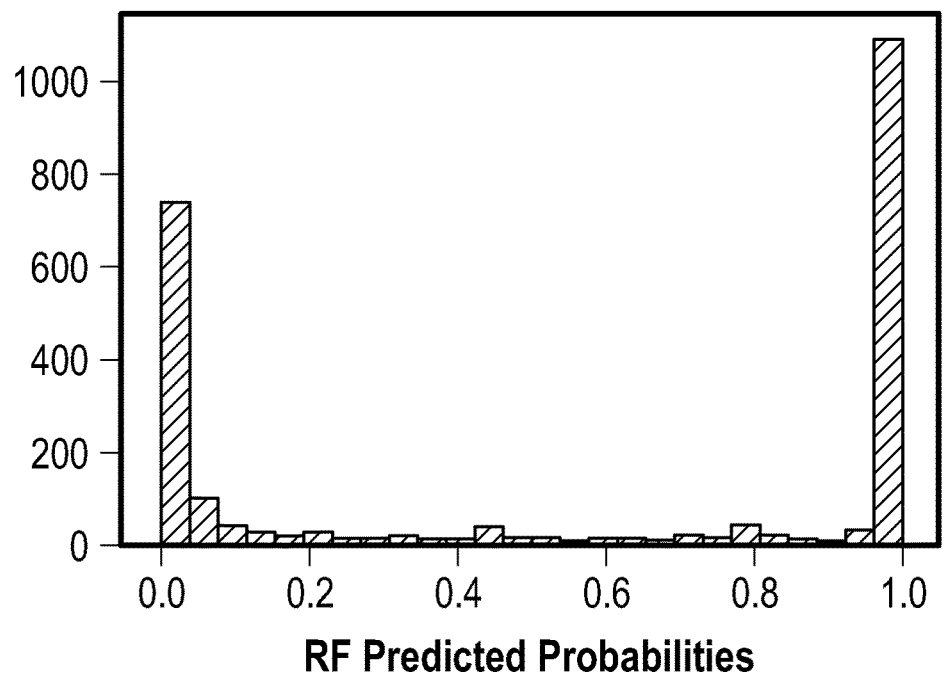
FIG. 14 shows RF Predicted probabilities.

FIG. 14 shows the RF predicted probabilities. The RF predictions are within the desired arcsine distribution, so this algorithm can be used to predict the risk of an individual file with the required pipelines and API integrations. The RF outperforms SVM on this metric as well, since more predictions were towards the extreme end of the certainty percentage than for SVM.

Random forest so far outperforms LR, SVM and KNN in all the desired metrics: AUC score, accuracy, recall, precision, confusion matrix review and in predicting probabilities.

Boosted Gradient Algorithm Results

A Python implementation of the boosted gradient "xgboost" (XGB) was installed and loaded into a Jupyter notebook. It was imported and trained with the default parameters. It yielded impressive results across the board in the desired metrics. The accuracy was 0.97, the recall for malicious files was 0.97 and the AUC score was an impressive 0.975 with still an overall precision of 0.98 for malicious files:

TABLE 3

XGB Classification report

|  | precision | recall | f1-score | support |
|---|---|---|---|---|
| 0 | 0.96 | 0.98 | 0.97 | 1053 |
| 1 | 0.98 | 0.97 | 0.98 | 1313 |
| accuracy |  |  | 0.97 | 2366 |
| macro avg | 0.97 | 0.98 | 0.97 | 2366 |
| weighted avg | 0.97 | 0.97 | 0.97 | 2366 |

The ROC AUC score for XB is –0.975271031376542

Figure 15:
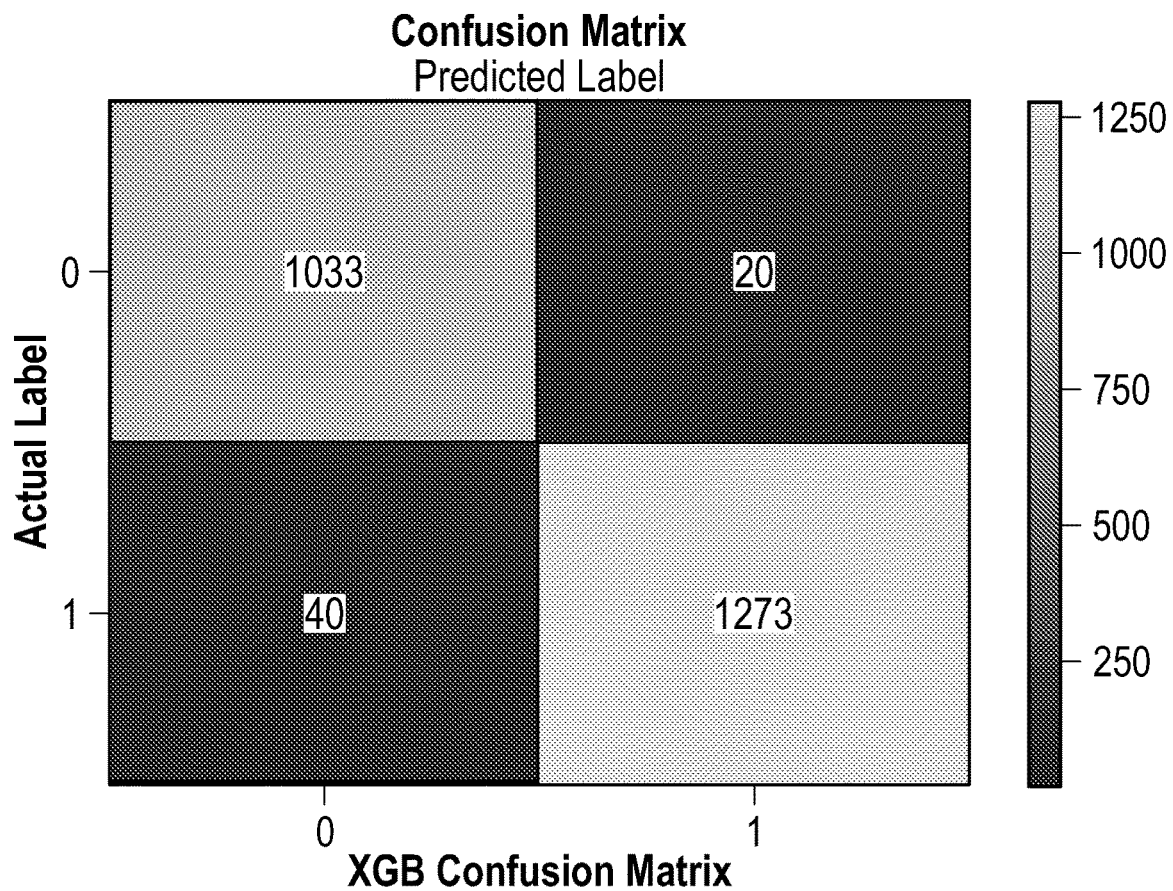
FIG. 15 shows a XGB Confusion matrix.

FIG. 15 shows the XGB confusion matrix, which has the desired color coding according to examples of the present disclosure.

Figure 16:
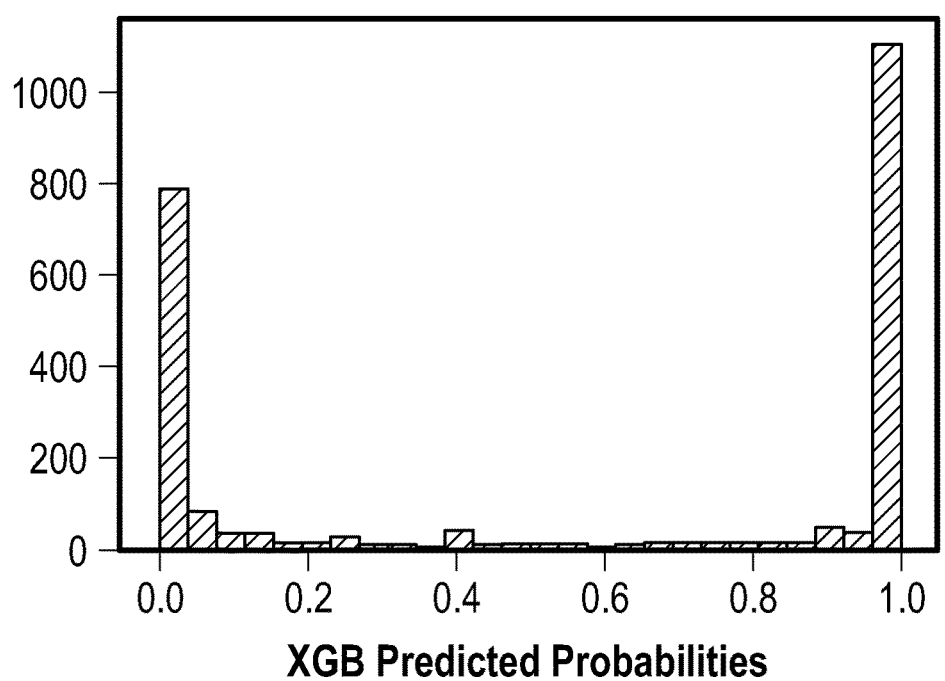
FIG. 16 shows XGB Predicted probabilities.

FIG. 16 shows the XGB predicted probabilities. The algorithm predicts the probability of the files being malicious in a similar manner as RF with a desired shape of an arcsine distribution curve. From the plotted probabilities, it can be seen that that the algorithm predicts with a great certainty the maliciousness of a file enabling great potential in predicting the risk of a file.

Example Results Summary

From the results presented, the XGB algorithm has the best performance metrics of all the algorithms assessed. The XGB algorithm displays strong performance metrics in (i.e. it is a winner) in accuracy, precision, recall, confusion matrix overview, AUC score and probability prediction.

Figure 17:
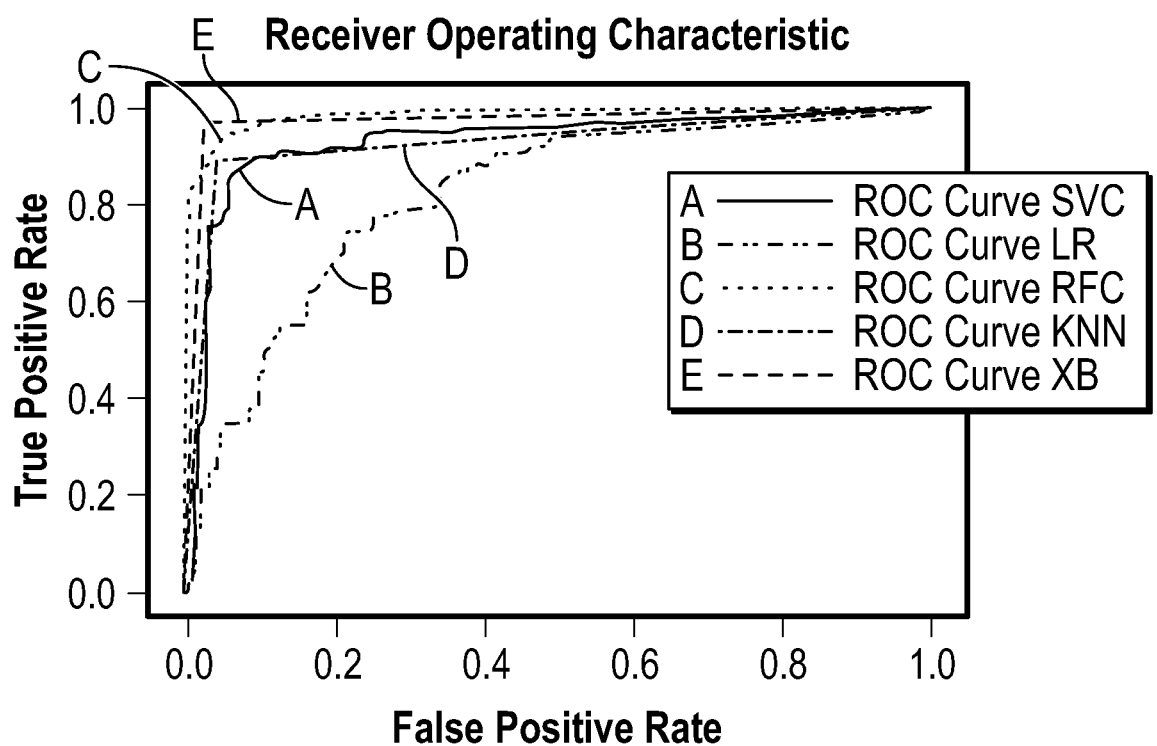
FIG. 17 shows receiver operating characteristic (ROC) curves.

FIG. 17 provides a comparison. Cross-validation here is a plotted ROC AUC curve for all the algorithms. Ideally the desirable ROC AUC curve should be as much as to the left and upwards as possible. LR has a comparatively poor performance while XGB (line E) and RF (line C) outperform the other algorithms within this metric.

Example 2 Results—Cross Validation

This example used the Scikit-Learn function for cross validation. The data was split into 5 folds and each fold was split into a test and training set with a 20% and 80% split, respectively. After importing and training the same algorithms as in the previous example, the classification report for every individual fold was used to calculate a mean for every metric. To compare the algorithm's performance all the metrics' mean values were parsed into a table exported into CSV format:

TABLE 4

Mean metrics for each model across 5 folds

| Model | Mean Recall | Mean Accuracy | Mean Precision | Mean F1 | Mean AUC | Metric Mean |
|---|---|---|---|---|---|---|
| RFC | 0.940880245 | 0.94260355 | 0.954570211 | 0.9470474 | 0.983576147 | 0.953736 |
| XGB | 0.931739012 | 0.939983094 | 0.958976605 | 0.9451411 | 0.986364233 | 0.952441 |
| KNN | 0.899283316 | 0.91876585 | 0.951750234 | 0.9247271 | 0.968002957 | 0.932506 |
| SVM | 0.906899694 | 0.848267117 | 0.8341294 | 0.8689731 | 0.929758541 | 0.877606 |
| LR | 0.135147122 | 0.512933221 | 0.912036432 | 0.2346308 | 0.828337049 | 0.524617 |

As visible on the table, the ensemble algorithms (RFC and XGB) outperformed all the other ones. These cross-validation results show that the test-train results might have been overly optimistic, and these results do provide a better representation of the potential algorithm performance with new unseen data. By comparing the metrics overall, RF may be the algorithm of choice with a tight win over XGB. RF also may produce a better recall and accuracy, which were important two metrics according to the present disclosure as it is desirable for the algorithm to perform well in recognizing malware while still not producing a lot of noise with false positives. These results are different than in Example 1 where XGB outperformed RF in all the metrics across the board. Surprisingly KNN overall outperformed SVM, however SVM had a better recall. Nevertheless, SVM would not be the algorithm of choice to use for this purpose as it did not yield desirable outcomes in predicting probabilities. LR once again proved it is less useful for this type of data.

The method introduced according to the present disclosure demonstrates it is worth comparing the winning algorithm (RF) metrics (accuracy and precision) with some other studies in other areas where machine learning was used for malware detection. This is demonstrated in the comparison table below:

TABLE 5

Comparison of RF and XGB to other malware classifiers

|  | Vukmirovic | | Vinayakumar et al - dynamic analysis | | Vinayakumar et al - image processing | | Mohan et al Dtrace | Walker and Sengupta - large dataset |
| --- | --- | --- | --- | --- | --- | --- | --- | --- |
|  | RF | XGB | RF | DNN | RF | CNN | RF | RF |
| Recall | 0.94 | 0.932 | 0.97 | 0.989 | 0.886 | 0.92 | 0.91 | uknown |
| Accuracy | 0.943 | 0.94 | 0.953 | 0.981 | 0.895 | 0.936 | 0.91 | 0.997 |

The results in the table above within different other studies are obtained with a different technique on different types of files: executables. However, the comparison still shows the proposed algorithms can act as malware detectors just as well as other machine learning malware classifiers. These algorithms can also be used for risk assessment of the file along with threat intelligence.

Example 3—SHAP Values and Feature Importances

The dataset used for the examples in this disclosure is a representation of the file content of each file. The hypothesis is that if file content is linked to malware, this is useful for threat intelligence studies. For example, this can help extract file content specific for an individual type of malware. Such a method to identify file content linked to malware is helpful in stopping the spread of unknown malware and may spawn a new generation of anti-malware tools based on content disarm and reconstruction and machine learning. The ensemble algorithms (RF and XGB) provided great results, and therefore those are the ones that were used to extract the important features and introduce a framework for threat intelligence. Initially the SHAP values were extracted for RF. The file type scored high in those values.

Figure 18:
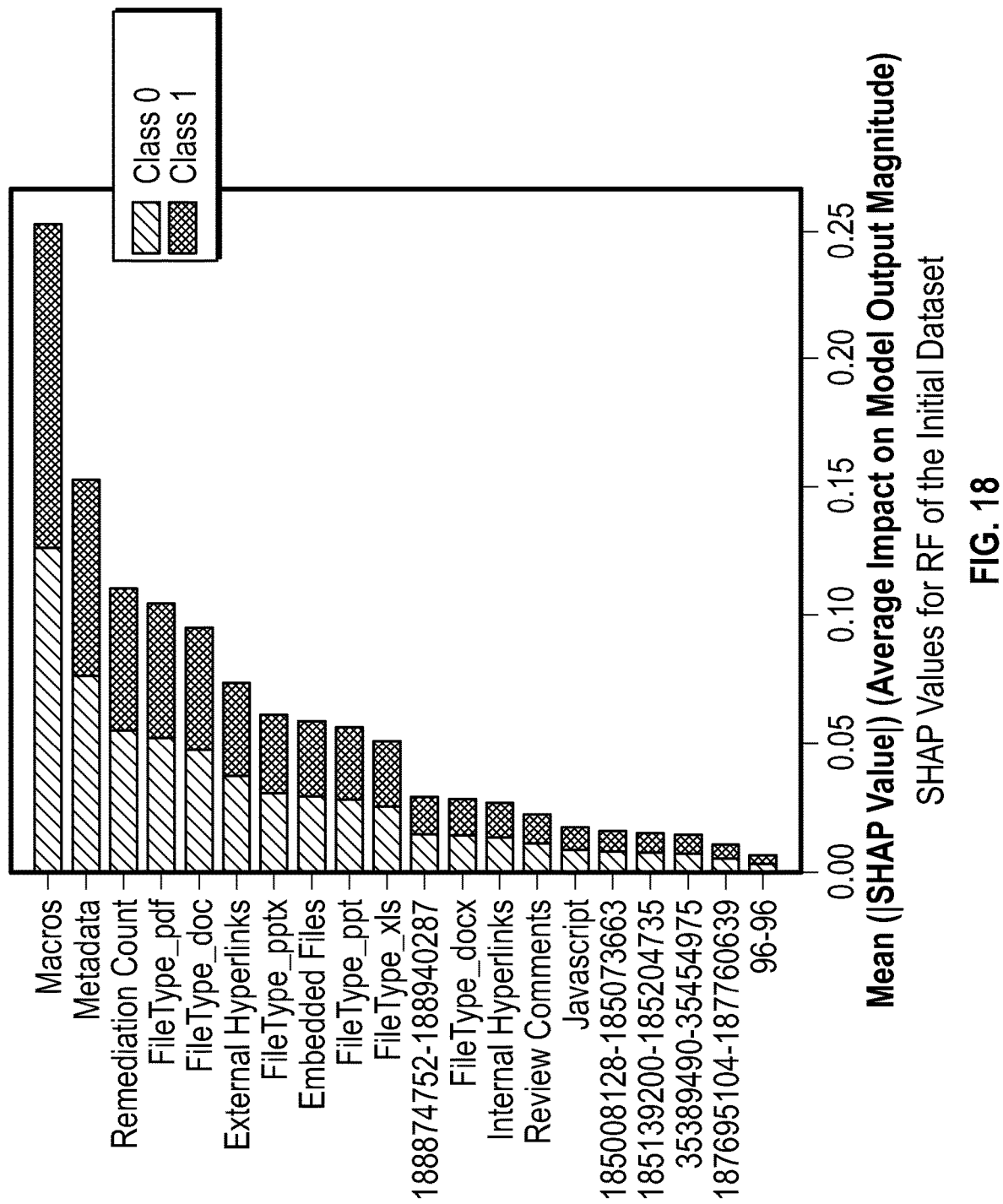
FIG. 18 shows SHAP values for RF of the initial dataset.

FIG. 18 shows SHAP values for RF of the initial dataset.

Because pdf files are the ones most commonly used to disseminate malware, a second dataset was compiled without the file type being parsed into features. This second dataset was used to calculate the SHAP values and feature importances in Example 3. By using Python pandas, the columns containing the file type were dropped. With that dataset a RF algorithm was fitted. The RF algorithm trained with this dataset had only slightly lower performance results on cross validation compared to the one trained on the full dataset. The mean accuracy was 0.927, and the mean recall was 0.926. The Python library SHAP was imported and the values were computed with the trained RF model.

Figure 19:
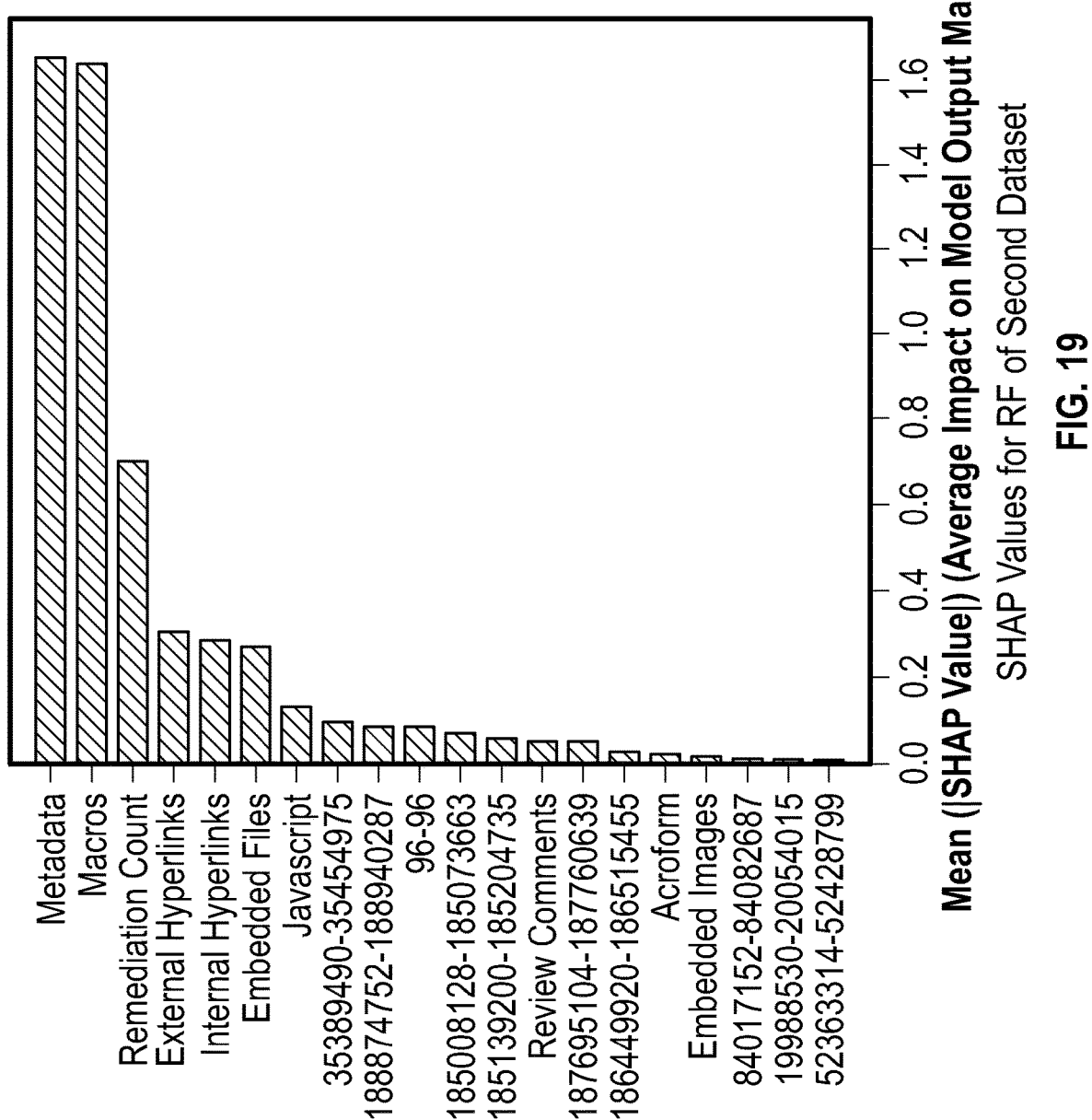
FIG. 19 shows a RF SHAP values plot.

FIG. 19 shows the resulting SHAP values for RF of the second dataset. This shows the algorithm uses file content features mainly to compute estimations. After that of some importance is the range 35389490-35454975 which is mapped to Excel Data Table Instances in the issue range segregation. The next one is 188874752-188940287 which belong to Header Document Instances; this could indicate that a proportion of malware is in the document header fields. A feature of importance is 96-96 which is mapped to Document Processing Instances. For the mapping of all the relevant Issue ID Ranges see the table below:

TABLE 6

SHAP RF Issue ID ranges importance and mapping

| Issue ID Range (descending order of importance) | Group Description |
| --- | --- |
| 35389490-35454975 | Excel Data Table Instances |
| 188874752-188940287 | Header Document Instances |
| 96-96 | Document Processing Instances |
| 185008128-185073663 | Endnote Document Instances |
| 185139200-185204735 | Endnote Document Instances |
| 187695104-187760639 | Header Document Instances |
| 186449920-186515455 | Embedded Document Instances |
| 84017152-84082687 | Not mapped yet |
| 19988530-20054015 | Not mapped yet |
| 52363314-52428799 | Power Point Office Art Instances |

These examples show that mapping of the ranges and calculating SHAP values can help reduce risk and identify malware locations and methods.

The SHAP values were computed also for the XGB algorithm after training and cross validation. Similarly, to RF the metrics did not show a significantly reduced performance with the reduced dataset: the mean recall was 0.926, and accuracy was 0.929.

Figure 20:
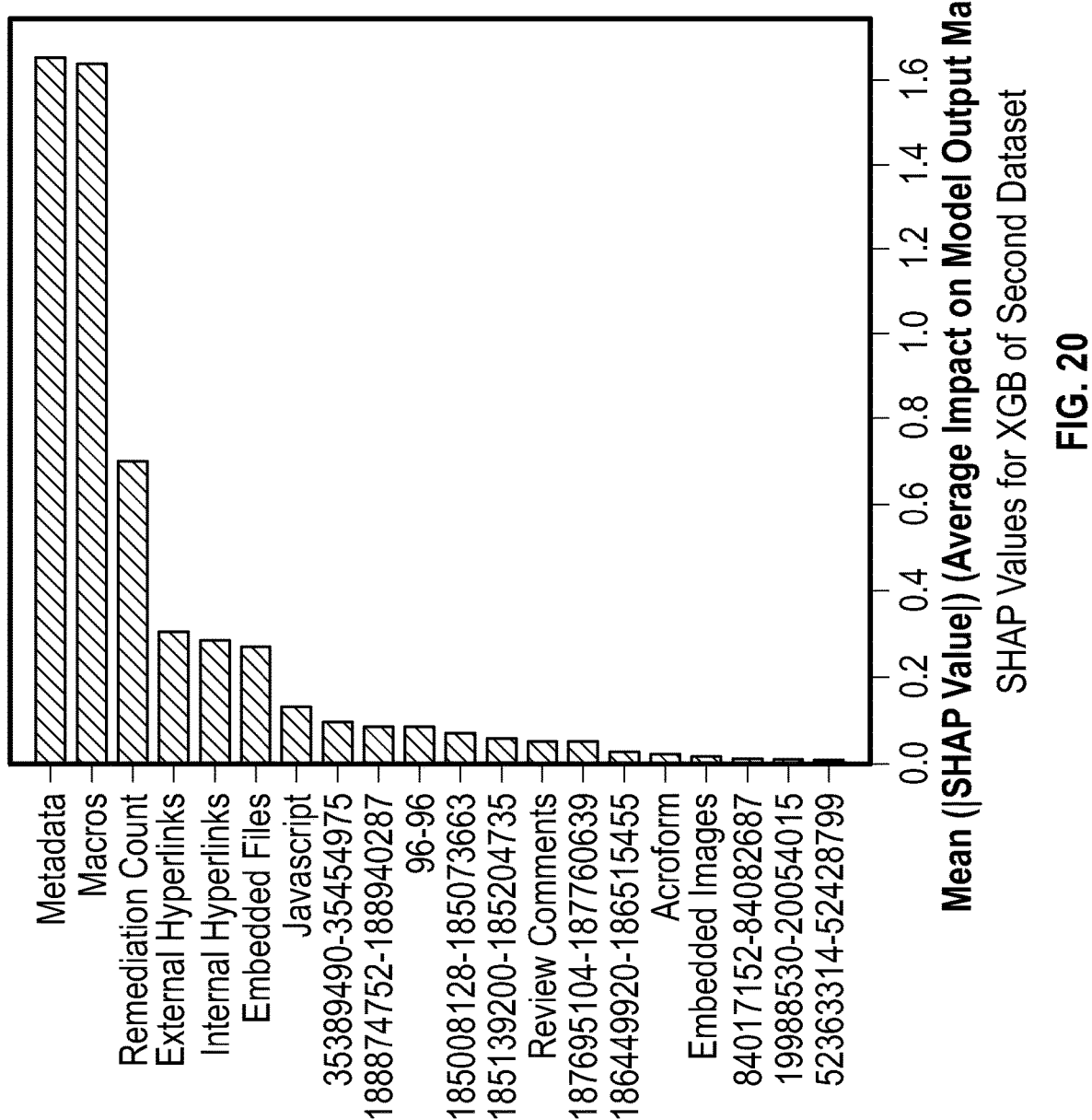
FIG. 20 shows XGB SHAP values.

FIG. 20 shows the plotted SHAP values for XGB of the second dataset. The plot demonstrates that the file content items were of most importance in estimating probabilities of a file being malicious. Metadata, macros, and remediation count seem to yield the highest risk in a file according to both models. Comparing the SHAP values of both models shows that the same features are used by both algorithms in the same order of importance.

Figure 21:
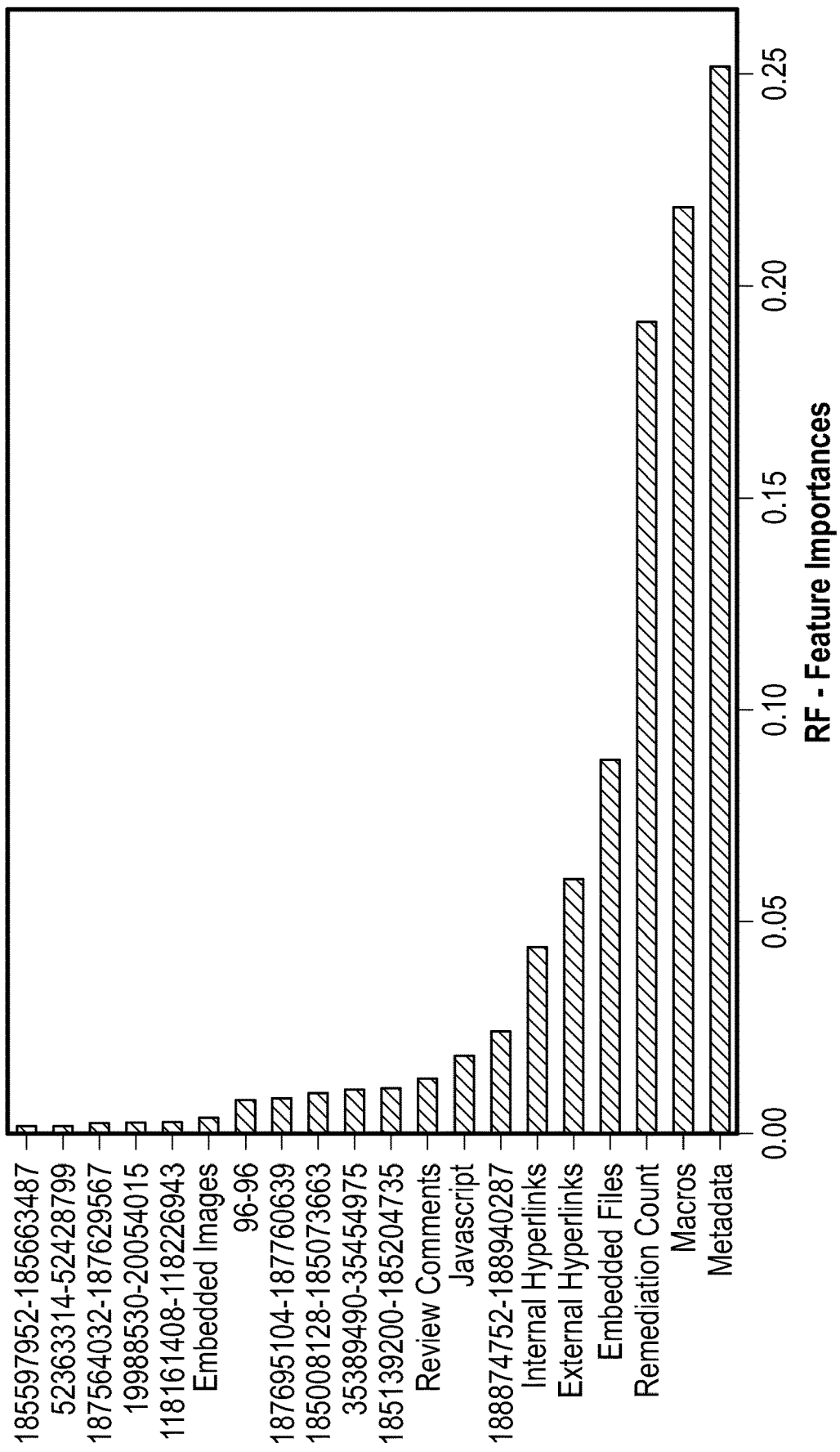
FIG. 21 shows RF Feature Importances.

FIG. 21 shows RF feature importances. For the same algorithms, feature importances were calculated and plotted by using Scikit-Learn's function. The results were very similar to the SHAP values computations indicating the high importance of metadata, macros, and remediation count.

The highest risk Issue ID ranges were slightly differently ranked for the feature importances function, as per table below:

TABLE 7

RF Issue ID ranges importance and mapping

| Issue ID Range (descending order of importance) | Group Description |
|---|---|
| 188874752-188940287 | Header Document Instances |
| 185139200-185204735 | Endnote Document Instances |
| 35389490-35454975 | Excel Data Table Instances |
| 185008128-185073663 | Endnote Document Instances |
| 187695104-187760639 | Header Document Instances |
| 96-96 | Document Processing Instances |
| 118161408-118226943 | WMF Document State Definitions Instances |
| 19988530-20054015 | Not mapped yet |
| 186449920-186515455 | Embedded Document Instances |
| 187564032-187629567 | Malformed common supporting data |
| 52363314-52428799 | Power Point Office Art Instances |
| 185597952-185663487 | Malformed embedded image JBIG filter stream |

As seen on the table, the important/risky features are almost the same, except that the feature importances computation also highlights WMF Document State Definitions Instances, Malformed common supporting data and Malformed embedded image JBIG filter stream into the top 20 important ones. This shows that malformed content in a file is a reliable high risk and malware indicator.

Figure 22:
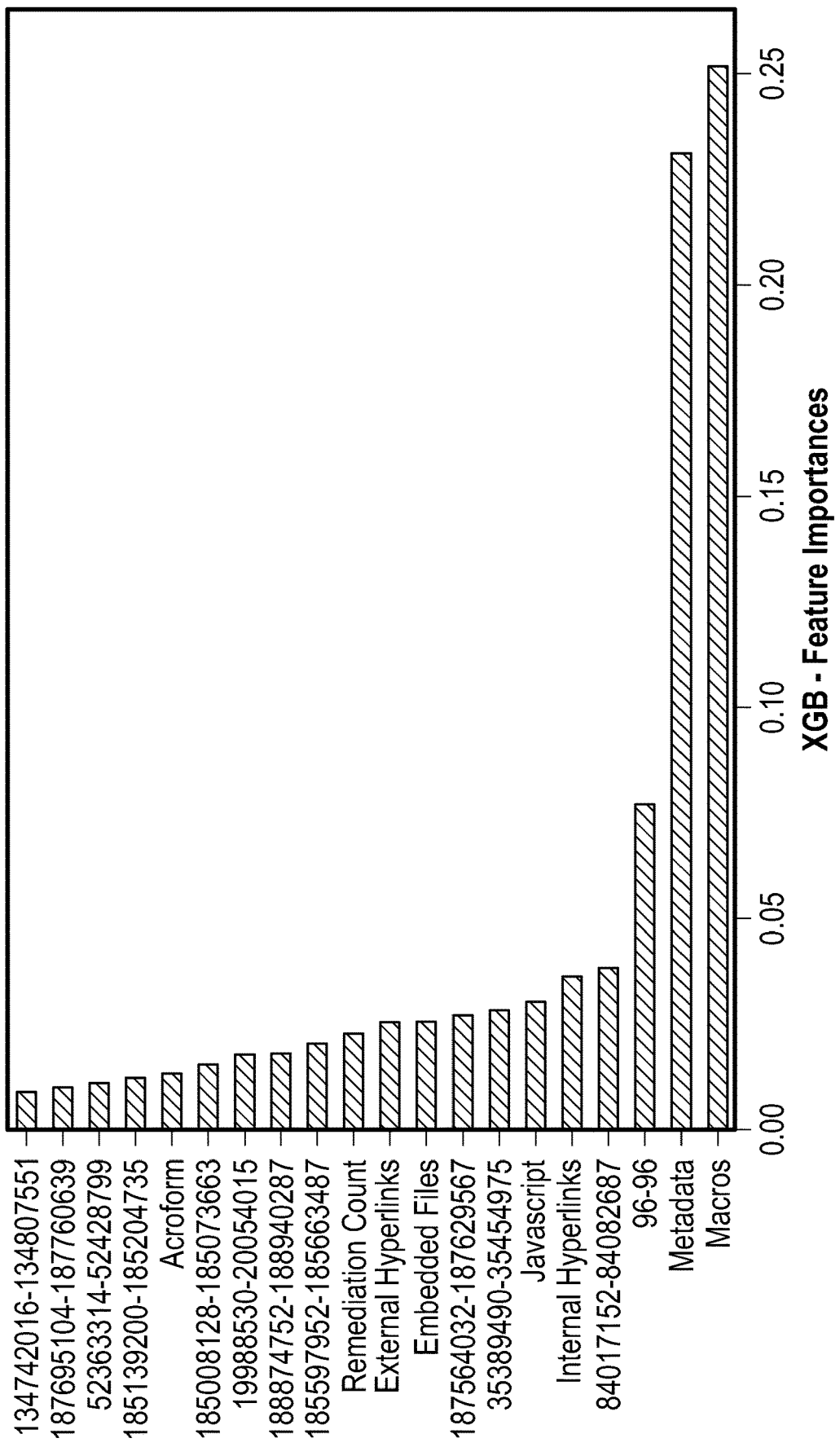
FIG. 22 shows XGB Feature Importances.

FIG. 22 shows XGB feature importances. The feature importances were computed for the trained XGB algorithm. Macros and Metadata were still the top risk indicators; however, the other features were almost the same as for RF but differently ranked. The remediation count got ranked much lower, while the range 96-96 jumped to 3rd place, as shown in this table:

TABLE 8

XGB Issue ID ranges importance and mapping

| Issue ID Range (descending order of importance) | Group Description |
|---|---|
| 96-96 | Document Processing Instances |
| 84017152-84082687 | OPC Stream Instances |
| 35389490-35454975 | Excel Data Table Instances |
| 187564032-187629567 | Malformed common supporting data |
| 185597952-185663487 | Malformed embedded image JBIG filter stream |
| 188874752-188940287 | Header Document Instances |
| 19988530-20054015 | Not mapped yet |
| 185008128-185073663 | Malformed basic object structure instances |
| 185139200-185204735 | Endnote Document Instances |
| 52363314-52428799 | Power Point Office Art Instances |
| 187695104-187760639 | Header Document Instances |
| 134742016-134807551 | PNG image file has PHYS chunk Instances |

OPC or "OLE (Object Linking and Embedding) for Process Control Stream Instances were flagged up by XGB as quite high risk. These tables show that features indicating malformed structures are of high risk.

As demonstrated herein, CDR can provide insight in malware structure, topology within a file, and behavior. Due to multi-dimensional data, further studies may become computationally expensive, including SHAP value calculations. To resolve this, a few solutions are available, including: principle component analysis (PCA), feature selection with SHAP and feature importances, deploying the algorithms in the cloud onto more powerful virtual machines and using neural networks for learning.

Due to features being categorical and one-hot encoding being used, some correlations might not have been expressed. As noted above, the number of remediations was important in the decision-making process, therefore it is a limitation not being able to express the remediations (individually or grouped) into the dataset. A solution to this may be mapping the numerous remediations that exist into groups that are representative of the type of remediation done during CDR.

The foregoing disclosure shows that CDR analysis when grouped with machine learning can be used to assess the risk of a file, even to the degree that it can be a high performing malware classification software. This method is different from many other methods for malware detection as it is not looking for known bad-it is looking for "known good" and it reports a delta (difference) between the actual analyzed document and the model "known good document." This information can then be used to assess risk (e.g., detect if the file is malicious or not).

This disclosure further shows that some features related to file content are a very high-risk feature indicative of maliciousness of a file. CDR as a method removes that same file content or remediates the issues, therefore this demonstrates that CDR is effective in clearing malware. Of very high risk is the remediation count. The CDR process involves the remediations and therefore reduces the risk of the file significantly.

The CDR analysis engine can be useful for unknown malware detection with a high accuracy. It also can be used to generate a probability scoring which reveals the innate risk of files parsed. By studying the feature importances and SHAP values we can link the CDR process to malware elimination directly. The remediation count can have a high direct correlation to the risk of the file (ranked 3rd in feature importances and SHAP values). This may be suggestive to a malware writer trialing various patterns in various fields and leaving behind a trace. This especially happens in unused fields where malware writers may explore inputting structures that are not expected to be in those fields. This tends to provide an evidentiary link between CDR remediations and malware. This is useful for analyzing malware behavior. XML exports of files generated by the CDR engine can be used to create a new dataset based purely on sequential file structure. This can be used to analyze which file structures are directly linked to malware. A modified core engine that provides a summary of exact remediations similarly grouped as the issues into ID ranges can be used to demonstrate malware behavior and assess risk.

CDR removes metadata and all the other file content items that were found as high risk by the machine learning algorithms, so this research shows that CDR reduces the risk of a file. This demonstrates machine learning provides new evidence in favor of CDR being an efficient anti-malware method.

The current algorithms can be used or updated with parameter tweaking and used with a bigger dataset (e.g., on cloud instances) to provide greater computational power to handle the training. A specific data set can be used to train various algorithms specific to a file type. SHAP values and feature importances can also be extracted per file type. This can help provide a set of features that are common and be used to pinpoint malware in a certain file type.

A higher performance and more economical computing with the algorithms can be achieved with feature selection. One of the ways that feature selection can be applied to the algorithms is by using unsupervised learning and principal component analysis (PCA). PCA is a method that rotates the dataset selecting only a subset of the new features, according to how important they are for explaining the data. PCA identifies the hyperplane that lies closest to the data, and then projects the data onto it. PCA can be used for machine learning pre-processing and one of its applications is feature extraction. Feature extraction is used to find a representation of the data that is better suited to analysis than the raw representation given initially. Another method for feature extraction is non-negative matrix factorization (NMF) which is applied to data where each feature is non-negative.

Multiple machine learning algorithms can be used in a pipeline. One algorithm can detect the malware and the second can be a multi-class classifier trained on a dataset that reveals the malware type. Afterwards, SHAP values and feature importances can be extracted that are linked to a certain malware type.

Examples of the invention provide a method of training a machine learning algorithm for addressing malware, the method comprising: providing files known to contain malware in a malicious group; providing files known not to contain malware in a non-malicious group; performing content disarm and reconstruction (CDR) analysis on files in both groups by: parsing the analyzed files into standard and unique components, re-creating standard components from known-good data according to standardized specifications, combining the re-created standard components with information from the unique components to create a substitute electronic file visually identical (e.g. when the file is displayed on a computer) to the analyzed file, and creating a machine readable summary report for each analyzed file, each report including multiple report items based on file content and structure; using the machine readable reports to train the machine learning algorithm by computing a probability function using an ensemble machine learning algorithm to estimate risk of the files that will generalize to new data and be useful for classifying unknown malware at least because the summary reports are based on file content and structure.

In some examples the machine readable reports are in extensible markup language (XML), the method further comprising, prior to using the XML machine readable reports to train the machine learning algorithm, using a script to incorporate selected report items into a dataset that comprises multiple summary reports arranged in a multi-dimensional array to facilitate comparison between the selected report items for each summary report, each summary report having a malware label within the multi-dimensional array, the malware label identifying if the underlying file is known to contain malware.

Some examples further comprise using the script to encode the selected categorical report items and malware labels into numerical representations.

Some examples further comprise using the script to establish presence or absence of the selected report items and, for those that are present, quantifying the number of those present report items that occur in a particular machine readable summary report.

Some examples further comprise shuffling the summary reports in the dataset to group them into a plurality of (e.g. at least three) random folds; further subdividing the summary reports in each fold into training and testing sets, and for each fold: using its (i.e. of the respective fold) training set to establish a new fitted algorithm by loading data in that training set into an initial machine learning model; testing the new fitted algorithm by using it (i.e. the new fitted algorithm) to predict malware labels and probabilities for each summary report in the fold, obtaining resulting metrics for those predictions for the fold, and averaging the metrics across the a plurality of (e.g. at least three) folds.

Some examples further comprise: evaluating subsequent machine learning models by using the summary reports in the dataset and, for subsequent machine learning models, repeating the steps of shuffling, grouping into folds, further subdividing into testing and training sets, establishing a new fitted algorithm, testing, obtaining metrics, and averaging.

Some examples further comprise comparing metrics for the fitted algorithms resulting from the machine learning models to determine the preferred model (e.g. machine learning model).

Some examples further comprise selecting a preferred machine learning model by initially splitting files into a larger training set and a smaller test set and comparing performance.

Some examples further comprise using a preferred machine learning model selected by using multiple folds of cross-validation for at least two ensemble machine learning algorithms and comparing performance.

In some examples comparing performance comprises using at least one metric selected from the following group: recall, accuracy, precision, Area Under the Curve for the Receiver Operator Characteristic graph, and the harmonic mean of precision and recall (F1 score).

In some examples the ensemble machine learning algorithm comprises at least one of a random forest or boosted gradient machine learning model.

Some examples further comprise using at least one of the function feature importances or the SHapley Additive explanations (SHAP) value method to determine correlation between the report items and whether a file was in the malicious or the non-malicious group.

In some examples report items comprise at least two of the following: issue ID ranges, file content items (wherein file content items can comprise any one or more of: dynamic data exchange, embedded files, embedded images, external or internal hyperlinks, macros, metadata, review comments, acroform, actions, and/or java script), file type, and number of remediations.

In some examples report items include number or type of remediations.

In some examples performing content disarm and reconstruction on an incoming file further comprises: deep file inspection that parses into memory and inspecting: a visual content having text and images, an active content layer having macros, scripts, embedded files, hyperlinks, or data connections; and a file structure layer storing visual and active content remediation that repairs the incoming files structure to comply with file type vendor specifications; or sanitization that removes active content according to a user policy designating needed or unneeded features.

In some examples the method comprises each of the listed steps, including deep file inspection, remediation, and sanitization.

Some examples comprise any of the methods herein disclosed incorporated for use in at least one of the following: a malware detection software tool; a file threat index for individual files; a risky feature selection tool for individual files; a threat intelligence software tool; and a malware type classification tool.

Further examples of the invention provide a method of determining incoming risk of an incoming file using machine learning algorithms, the method comprising: performing a content disarm and reconstruction process on a set of malicious files and a set of non-malicious files; establishing a dataset with a plurality of (e.g. at least three) selected features identified in reports originating from the content disarm and reconstruction process; training an algorithm to predict if a file is malicious using an ensemble machine learning model; testing the trained algorithm by comparing predicted malicious probabilities to known malicious status of files; and using the trained algorithm to provide a probability of an unknown file's malicious status.

Some examples further comprise computing one or more of SHAP values and feature importances of the plurality (e.g. at least three) selected features, and wherein the ensemble machine learning model comprises at least one of a random forest or boosted gradient machine learning model.

Some examples further comprise at least one of: using the trained algorithm to evaluate files with unknown malicious status to do at least one of the following: determine probability that the files include unknown malware; determine the risk of individual files; and extract file content structures linked to malware.

Further examples of the invention provide a method of risk mitigation for incoming electronic files, the method comprising: analyzing multiple initial untrusted files of a given file type by a CDR process comprising: comparing standard portions of their electronic contents (i.e. of the untrusted files) with file portions known to comply with manufacturer specifications for that same file type (of untrusted file); determining a difference delta based on the comparison and classifying the untrusted files as high risk if the delta is above a threshold without reference to data from known malicious files; and providing outputs for the untrusted files showing data locations and characteristics underlying the difference delta; establishing a data set from the outputs; and with a trained malware detection algorithm that has been trained using the data from content disarm and reconstruction analysis (CDR) outputs and comparison to known malicious files, establishing a risk score for new untrusted files based on the CDR process alone and without reference to data from known malicious files.

In some examples the CDR outputs include remediation count information.

Some examples further comprise using an application program interface to provide the risk score for a file as a percentage.

In some examples the trained malware detection algorithm has been trained using at least one of a random forest or boosted gradient model.

In some examples the trained malware detection algorithm that has been trained has used a process comprising computing at least one of SHAP values and feature importances.

Some examples further comprise: classifying files according to risk level; using an ensemble machine learning algorithm to obtain a likelihood that the classification is accurate; and calculating at least one of SHAP values or feature importance values.

Further examples of the invention provide a method of developing a malware protection algorithm, the method comprising: using outputs from a content disarm and reconstruction algorithm that does not refer to any existing malware database to reconstruct safe files, the outputs comprising multiple data types; selecting from the data types from the outputs to establish a dataset; and evaluating multiple machine learning algorithms by using a code visualization tool and fitting data in the dataset for each machine learning algorithm.

Some examples further comprise: using files with known malware status to establish the outputs from the content disarm and reconstruction algorithm; using the multiple machine learning algorithms to predict malware status; and testing accuracy of the malware status predictions to evaluate the algorithms.

Some examples further comprise computing feature importances or SHAP values to determine information about relevance of different data types to malware analysis.

The foregoing examples may be combined in any suitable manner, according to further examples of the present disclosure, and in accordance with the detailed disclosure above.

The invention claimed is:

1. A method of training a machine learning algorithm for addressing malware, the method comprising:
    providing files known to contain malware in a malicious group;
    providing files known not to contain malware in a non-malicious group;
    performing content disarm and reconstruction (CDR) analysis on files in both groups by:
        parsing the analyzed files into standard and non-standard components,
        re-creating standard components from known-good data according to standardized specifications,
        combining the re-created standard components with information from the non-standard components to create a substitute electronic file visually identical to the analyzed file, and
        creating a machine readable summary report for each analyzed file, each machine readable summary report including multiple report items based on file content and structure;
    training the machine learning algorithm with the machine readable summary reports and computing a probability function with the machine learning algorithm to estimate risk of the files that will generalize to new data and be useful for classifying unknown malware at least because the machine readable summary reports are based on file content and structure.

2. The method of claim 1, wherein the machine readable summary reports are in extensible markup language (XML), the method further comprising, prior to training the machine learning algorithm with the XML machine readable summary reports, incorporating selected report items into a dataset that comprises multiple summary reports arranged in a multi-dimensional array to facilitate comparison between the selected report items for each summary report, each summary report having a malware label within the multi-dimensional array, the malware label identifying if the underlying file is known to contain malware.

3. The method of claim 2, further comprising encoding the selected report items and malware labels into numerical representations.

4. The method of claim 3, further comprising establishing presence or absence of the selected report items and, for those that are present, quantifying the number of those present report items that occur in a particular machine readable summary report.

5. The method of claim 4, further comprising:
    shuffling the summary reports in the dataset to group them into a plurality of random folds;
    further subdividing the summary reports in each fold into training sets and testing sets, and for each fold:
        establishing a new fitted algorithm by loading data in the training set for that fold into an initial machine learning model;

testing the new fitted algorithm by predicting, with the new fitted algorithm, malware labels and probabilities for each summary report in the fold, obtaining resulting metrics for those predictions for the fold, and averaging the metrics across the plurality of folds.

6. The method of claim 5, further comprising: evaluating subsequent machine learning models by using the summary reports in the dataset and, for subsequent machine learning models, repeating the steps of shuffling, grouping into folds, further subdividing into training sets and testing sets, establishing a new fitted algorithm, testing, obtaining metrics, and averaging.

7. The method of claim 6, further comprising comparing metrics for the fitted algorithms resulting from the machine learning models to determine a preferred machine learning model.

8. The method of claim 2, further comprising selecting a preferred machine learning model by initially splitting files into a larger training set and a smaller test set and comparing performance.

9. The method of claim 1, further comprising deploying a preferred machine learning model selected through performing multiple folds of cross-validation for at least two machine learning algorithms and comparing performance.

10. The method of claim 9, wherein comparing performance comprises applying at least one metric selected from the following group: recall, accuracy, precision, Area Under the Curve for the Receiver Operator Characteristic graph, and the harmonic mean of precision and recall (F1 score).

11. The method of claim 1, wherein the machine learning algorithm comprises at least one of a random forest or boosted gradient machine learning model.

12. The method of claim 1, further comprising applying at least one of function feature importances or a SHapley Additive explanations (SHAP) value method to determine correlation between the report items and whether a file was in the malicious or the non-malicious group.

13. The method of claim 1, wherein the report items comprise at least two of the following:
issue ID ranges;
file content items;
file type; and
number of remediations.

14. The method of claim 1, wherein the report items include number or type of remediations.

15. The method of claim 1, wherein performing content disarm and reconstruction on an incoming file further comprises:
deep file inspection that parses into memory and inspecting:
a visual content having text and images, an active content layer having macros, scripts, embedded files, hyperlinks, or data connections; and
a file structure layer storing visual and active content;
remediation that repairs the incoming files structure to comply with file type vendor specifications; or
sanitization that removes active content according to a user policy designating needed or unneeded features.

16. The method of claim 15, wherein the method comprises each of the listed steps, including deep file inspection, remediation, and sanitization.

17. The method of claim 1 incorporated for use in at least one of the following:
a malware detection software tool;
a file threat index for individual files;
a risky feature selection tool for individual files;
a threat intelligence software tool; and
a malware type classification tool.

18. A method of determining incoming risk of an incoming file using machine learning algorithms and the method of claim 1, the method comprising:
performing a content disarm and reconstruction process on a set of malicious files and a set of non-malicious files;
establishing a dataset with a plurality of selected features identified in reports originating from the content disarm and reconstruction process;
training a machine learning algorithm to predict if a file is malicious through the method of claim 1;
testing the trained machine learning algorithm by comparing predicted malicious probabilities to known malicious status of files; and
applying the trained machine learning algorithm to provide a probability of an unknown file's malicious status.

19. The method of claim 18, further comprising applying the trained machine learning algorithm to evaluate files with unknown malicious status to do at least one of the following:
determine probability that the files include unknown malware;
determine the risk of individual files; and
extract file content structures linked to malware.

* * * * *